(12) United States Patent
Mitsutomi et al.

(10) Patent No.: US 12,092,188 B2
(45) Date of Patent: Sep. 17, 2024

(54) V-RIBBED BELT AND METHOD FOR PRODUCING SAME

(71) Applicant: Mitsuboshi Belting Ltd., Kobe (JP)

(72) Inventors: Manabu Mitsutomi, Hyogo (JP); Yuji Kamba, Hyogo (JP); Yorifumi Hineno, Hyogo (JP)

(73) Assignee: Mitsuboshi Belting Ltd., Kobe (JP)

( * ) Notice: Subject to any disclaimer, the term of this patent is extended or adjusted under 35 U.S.C. 154(b) by 459 days.

(21) Appl. No.: 17/426,512

(22) PCT Filed: Jan. 24, 2020

(86) PCT No.: PCT/JP2020/002613
§ 371 (c)(1),
(2) Date: Jul. 28, 2021

(87) PCT Pub. No.: WO2020/158629
PCT Pub. Date: Aug. 6, 2020

(65) Prior Publication Data
US 2022/0099157 A1    Mar. 31, 2022

(30) Foreign Application Priority Data

Jan. 28, 2019 (JP) .................. 2019-012559
Oct. 25, 2019 (JP) .................. 2019-194656
Dec. 27, 2019 (JP) .................. 2019-238462

(51) Int. Cl.
*F16G 5/08* (2006.01)
*F16G 5/20* (2006.01)

(52) U.S. Cl.
CPC .................. *F16G 5/08* (2013.01); *F16G 5/20* (2013.01)

(58) Field of Classification Search
CPC ..................................... F16G 5/08; F16G 5/20
(Continued)

(56) References Cited

U.S. PATENT DOCUMENTS 5,232,409 A      8/1993   Kanamori et al.
8,859,081 B2 *  10/2014  Baldovino .............. B32B 25/10
                                                          524/565
(Continued)

FOREIGN PATENT DOCUMENTS

EP     1637767 A2 *  3/2006  ............... F16G 1/28
EP     3406665 A1    11/2018
(Continued)

OTHER PUBLICATIONS

Mar. 24, 2020—International Search Report—Intl App PCT/JP2020/002613.
(Continued)

*Primary Examiner* — Henry Y Liu
*Assistant Examiner* — Mark K Buse
(74) *Attorney, Agent, or Firm* — Banner & Witcoff, Ltd.

(57) ABSTRACT

A V-ribbed belt includes a compression rubber layer having a frictional power transmission surface that is covered with a fabric. The compression rubber layer includes an inner rubber layer in contact with the fabric and an outer rubber layer on an outer side of the inner rubber layer. The inner rubber layer is formed of a rubber composition having a Mooney Scorch minimum viscosity of 50 to 110 when measured at 125° C., and the outer rubber layer is formed of a rubber composition having a Mooney Scorch minimum viscosity of 70 to 130 when measured at 125° C.

15 Claims, 3 Drawing Sheets

(58) Field of Classification Search
USPC .......................................................... 474/264
See application file for complete search history.

(56) References Cited

U.S. PATENT DOCUMENTS

| | | | | |
|---|---|---|---|---|
| 9,194,458 | B2* | 11/2015 | Furukawa | ................. F16G 5/20 |
| 9,506,527 | B2* | 11/2016 | South | ......................... F16G 5/20 |
| 9,702,434 | B2* | 7/2017 | Takahashi | ................... C08J 5/04 |
| 2003/0087715 | A1 | 5/2003 | Fujimoto | |
| 2006/0079362 | A1* | 4/2006 | Tomobuchi | ............... F16G 1/28 |
| | | | | 474/260 |
| 2009/0291796 | A1* | 11/2009 | Mitsutomi | .............. F16G 5/166 |
| | | | | 474/252 |
| 2010/0167860 | A1 | 7/2010 | Mori et al. | |
| 2010/0173740 | A1 | 7/2010 | Mori et al. | |
| 2012/0295748 | A1* | 11/2012 | Shiriike | .................... F16G 5/20 |
| | | | | 474/264 |
| 2014/0135161 | A1 | 5/2014 | Mori et al. | |
| 2014/0296011 | A1* | 10/2014 | Yoshida | .................... F16G 5/08 |
| | | | | 264/172.19 |
| 2014/0364262 | A1 | 12/2014 | Mori et al. | |
| 2016/0053851 | A1 | 2/2016 | Kojima et al. | |
| 2016/0273616 | A1 | 9/2016 | Takehara et al. | |
| 2016/0298725 | A1 | 10/2016 | Ishiguro et al. | |
| 2019/0276954 | A1 | 9/2019 | Tomoda | |

FOREIGN PATENT DOCUMENTS

| | | | | |
|---|---|---|---|---|
| JP | H03-053107 | B2 | | 8/1991 |
| JP | H07-12753 | Y2 | | 3/1995 |
| JP | 2949331 | B2 | | 9/1999 |
| JP | 2003130137 | A | | 5/2003 |
| JP | 2007-144714 | A | | 6/2007 |
| JP | 2007144714 | A | * | 6/2007 |
| JP | 2010-539394 | A | | 12/2010 |
| JP | 2014-209026 | A | | 11/2014 |
| JP | 2014-209028 | A | | 11/2014 |
| JP | 2015-194239 | A | | 11/2015 |
| JP | 2017-007283 | A | | 1/2017 |
| JP | 2018-071035 | A | | 5/2018 |
| JP | 6450269 | B2 | * | 1/2019 |
| WO | WO-2017033392 | A1 | * | 3/2017 ............. B32B 25/02 |
| WO | 2018/190940 | A1 | | 10/2018 |

OTHER PUBLICATIONS

Oct. 21, 2022—(EP) Extended Search Report—App 20747836.3.
Sep. 29, 2022—(CN) Notification of First Office Action—App 202080010684.7.
Editorial Committee of Concise Manual of Rubber Industry Raw Materials and Equipments Beijing Institute of Technology Press, "Concise Manual of Rubber Industry Raw Materials and Equipments, 2016 Version," Nov. 2016, p. 424. The concise explanation of this document is included in the Chinese Office Action dated Sep. 29, 2022 cited above.

* cited by examiner

V-RIBBED BELT AND METHOD FOR PRODUCING SAME

CROSS REFERENCE TO RELATED APPLICATIONS:

This is a U.S. National Phase Application under 35 U.S.C. § 371 of International Application No. PCT/JP2020/002613, filed Jan. 24, 2020, which claims priority to Japanese Application Nos. 2019-012559, filed Jan. 28, 2019, 2019-194656, filed Oct. 25, 2019, and 2019-238462, filed Dec. 27, 2019, which was published Under PCT Article 21(2), the entire contents of which are incorporated herein by reference.

TECHNICAL FIELD

The present invention relates to a V-ribbed belt in which a frictional power transmission surface of a compression rubber layer is covered with a fabric (knitted fabric, etc.) and a method for producing the V-ribbed belt.

BACKGROUND ART

Power transmission belts are roughly classified into a mesh power transmission belt and a frictional power transmission belt according to the difference in power transmission mechanism. In the mesh power transmission belt, a tooth portion of the belt is mechanically fitted with a groove of a pulley to transmit power. Since no slip occurs between the belt and the pulley in the mesh power transmission belt, it is suitable for synchronous power transmission between a drive side and a driven side. However, since slip is not allowed in the mesh power transmission belt, when an excessive load is generated, the load cannot be released and the belt may be damaged.

On the other hand, in the frictional power transmission belt, power is transmitted between the belt and the pulley via a frictional force. Since some slip is allowed between the belt and the pulley in the frictional power transmission belt, the load can be released even when an excessive load is generated. Therefore, the mesh power transmission belt and the frictional power transmission belt have different uses, which are good at different power transmission mechanisms, and are used properly according to the purpose.

As the frictional power transmission belt, a flat belt, a V-belt, a V-ribbed belt and the like are known. Among these, the V-ribbed belt is widely used for driving an auxiliary machine of automobiles because of being capable of achieving both high power transmission capacity and bending fatigue resistance. Some V-ribbed belts have a surface of a compression rubber layer covered with a reinforcing fabric in order to improve wear resistance or adjust a friction coefficient. A woven fabric, a knitted fabric, a non-woven fabric, or the like can be applied to the reinforcing fabric, and as a fiber constituting these reinforcing fabrics, various fibers can be used in accordance with the requirements such as wear resistance and water absorbency.

For example, Patent Literature 1 discloses a V-ribbed belt in which a rib surface is covered with a fabric, the fabric can be tensioned and compressed in two predetermined directions, a belt matrix of the V-ribbed belt penetrates the structure of the fabric, and the V-ribbed belt is produced using a molded production method; in the molded production method, the fabric whose rib surface is disposed on an outer periphery of the belt matrix is molded by pressing the fabric together with the belt matrix into a multi-rib-shaped mold provided on an inner peripheral surface of a shell and vulcanizing the belt matrix, and the canvas can be tensioned to fit the multi-rib shape. It is also described that by selecting the tension ability of the fabric, the penetration of the matrix can be indirectly controlled, thereby controlling the friction coefficient on the rib surface.

In addition, Patent Literature 2 discloses a V-ribbed belt whose frictional power transmission surface is covered with a knitted fabric, in which the knitted fabric is knitted with a polyester-based composite yarn and a cellulose-based natural spun yarn, the polyester-based composite yarn is a bulky textured yarn, and the knitting ratio of the cellulose-based natural spun yarn is equal to or higher than the knitting ratio of the polyester-based composite yarn. It is also disclosed that, with such a configuration, the bulkiness of the bulky textured yarn prevents the rubber of the belt body from bleeding out to the frictional power transmission surface, and prevents the friction coefficient of the frictional power transmission surface from increasing in a dry state and decreasing in a wet state. It is further disclosed that, a hydrophilic treatment agent may be contained or adhered to the knitted fabric, a metal salt of an unsaturated carboxylic acid may be contained as a co-crosslinking agent, and an ultra high molecular weight polyethylene may be contained as a lubricant. Furthermore, Patent Literature 2 discloses that a rubber sheet for tension layer, a cord, a rubber sheet for compression layer, and the knitted fabric are laminated in order, and this molded body is produced by being pressed toward a rib mold of an outer mold and being vulcanized while utilizing the expansion force of a flexible jacket.

CITATION LIST

Patent Literature

Patent Literature 1: JP-T-2010-539394 (the term "JP-T" as used herein means a published Japanese translation of a PCT patent application)

Patent Literature 2: JP-A-2014-209028

SUMMARY OF INVENTION

Technical Problem

As disclosed in the above Patent Literatures 1 and 2, it is known that the bleeding-out of the rubber of the belt body to the frictional power transmission surface is controlled by the tension rate or the bulkiness of the reinforcing fabric covering the surface of the compression layer or the viscosity of the rubber layer. However, in the configurations disclosed in Patent Literatures 1 and 2, this effect may not be sufficient. That is, in order to produce a V-ribbed belt in which the surface of the compression layer is covered with a knitted fabric by the method described in Patent Literature 2, it is necessary to press the molded body with a higher pressure as the elastic modulus of the cord increases. Then, when the molded body is press-fitted into the rib mold of the outer mold at high pressure, the rubber of the belt body easily bleeds out to the frictional power transmission surface. On the other hand, in recent years, regarding the application of the V-ribbed belt, in order to enable power transmission under high load, a cord having a high elastic modulus is often used, and it is not possible to sufficiently prevent the rubber of the belt body from bleeding out to the frictional power transmission surface only with the configurations disclosed in Patent Literatures 1 and 2.

Therefore, an object of the present invention is to provide a V-ribbed belt which is excellent in sound emission resistance while preventing the rubber of the belt body from bleeding out to the frictional power transmission surface even when the molded body is pressurized and molded in a vulcanization step, and a method for easily producing such a V-ribbed belt.

Another object of the present invention is to provide a V-ribbed belt in which the bleeding-out of the rubber to the frictional power transmission surface is prevented and the rib portion is accurately formed, and a method for producing the V-ribbed belt.

Still another object of the present invention is to provide a V-ribbed belt that can improve wear resistance of the knitted fabric and maintain sound emission resistance during water injection for a long period of time, and a method for producing the V-ribbed belt.

Still another object of the present invention is to provide a V-ribbed belt which has improved durability while preventing the bleeding-out of the rubber to the frictional power transmission surface even when the V-ribbed belt is produced using a cord having a high tensile elastic modulus and the molded body is pressurized at high pressure in the vulcanization step, and a method for producing the V-ribbed belt.

Solution to Problem

As a result of diligent studies to achieve the above problems, the present inventors have found that when, in a V-ribbed belt in which a surface (frictional power transmission surface) of a compression rubber layer is covered with a fabric (a fabric such as a knitted fabric), the compression rubber layer is formed of an inner rubber layer having a specific Mooney Scorch minimum viscosity (a minimum value of Mooney viscosity) and in contact with the fabric and an outer rubber layer having a specific Mooney Scorch minimum viscosity on an outer peripheral side of the inner rubber layer, the rubber of the belt body can be effectively prevented from bleeding out to the frictional power transmission surface, and the sound emission resistance can be greatly improved. Thus, the present invention has been completed.

That is, a V-ribbed belt including a compression rubber layer having a frictional power transmission surface that is covered with a fabric (a fabric such as a knitted fabric), the compression rubber layer including an inner rubber layer in contact with the fabric and an outer rubber layer on an outer side of the inner rubber layer, wherein the inner rubber layer is formed of a rubber composition having a Mooney Scorch minimum viscosity of 50 to 110 when measured at 125° C., and wherein the outer rubber layer is formed of a rubber composition having a Mooney Scorch minimum viscosity of 70 to 130 when measured at 125° C. When the compression rubber layer is formed of such a rubber composition, it is possible to effectively prevent rubber of a belt body from bleeding out from the fabric (knitted fabric, etc.) even when a molded body is pressurized in a vulcanization step. Thus, when the inner rubber layer is formed of the rubber composition having a Mooney Scorch minimum viscosity of 50 to 110, it is possible to prevent the bleeding-out of the rubber composition to the frictional power transmission surface. In addition, when the outer rubber layer is formed of the rubber composition having a Mooney Scorch minimum viscosity of 70 to 130, a power friction transmission portion (for example, a rib portion) can be formed with high accuracy, and the rib shape can be prevented from being defective. Further, since the frictional power transmission surface is covered with a fabric, it is possible to prevent the generation of abnormal noise even when it is exposed to water and it is deteriorated, and it is possible to stabilize power friction transmission properties. Furthermore, sound emission limit tension can be reduced, and sound emission (abnormal noise) can be effectively prevented even when the belt tension is set low.

The inner rubber layer may be formed of a rubber composition having a Mooney Scorch minimum viscosity lower than that of the rubber composition forming the outer rubber layer.

A thickness ratio of the inner rubber layer to the entire compression rubber layer may be about 1% to 50%.

The rubber composition forming the inner rubber layer may contain a hydrophilic plasticizer (hydrophilic treatment agent or surfactant). In addition, the rubber composition forming the inner rubber layer may contain polyolefin particles. Further, the fabric may be impregnated with or adhered to an isocyanate compound.

The V-ribbed belt may further include a cord extending in a longitudinal direction of a belt body, and a tensile elastic modulus of fibers constituting the cord may be 50 GPa or more.

The V-ribbed belt may include: a belt body including at least a tension rubber layer forming a belt back surface and the compression rubber layer laminated on an inner peripheral surface of the tension rubber layer and having rib portions extending in a longitudinal direction; a cord embedded in the longitudinal direction of the belt body; and the fabric which is a knitted fabric laminated on the rib portions as the frictional power transmission surface and containing at least cellulose fibers, wherein the inner rubber layer is formed of the rubber composition having a Mooney Scorch minimum viscosity of 60 to 100 when measured at 125° C., wherein the outer rubber layer is formed of the rubber composition having a Mooney Scorch minimum viscosity of 80 to 120 when measured at 125° C., wherein the cord is formed of aramid fibers and/or carbon fibers, and wherein the knitted fabric is impregnated with or adhered to at least a block-type polyisocyanate compound.

The present invention also relates to a method for producing the above V-ribbed belt. This method includes: disposing, on a cylindrical inner mold disposed in a hollow cylindrical outer mold (for example, a cylindrical inner mold disposed concentrically), an unvulcanized laminate including an unvulcanized rubber sheet for compression rubber layer and a fabric laminated on the unvulcanized rubber sheet so that the fabric is directed toward the outer mold; pressurizing the unvulcanized rubber sheet at least toward the outer mold to vulcanize the unvulcanized rubber sheet; and demolding a molded body of the vulcanized rubber sheet and the fabric to produce a V-ribbed belt having a predetermined form. In the present invention, in such a method, the unvulcanized rubber sheet for compression rubber layer is formed of an unvulcanized rubber sheet for inner rubber layer in contact with the fabric and an unvulcanized rubber sheet for outer rubber layer on an outer peripheral side of the unvulcanized rubber sheet for inner rubber layer, the unvulcanized rubber sheet for inner rubber layer is formed of a rubber composition having a Mooney Scorch minimum viscosity of 50 to 110 when measured at 125° C., and the unvulcanized rubber sheet for outer rubber layer is formed of a rubber composition having a Mooney Scorch minimum viscosity of 70 to 130 when measured at 125° C. In this method, the unvulcanized rubber sheet may be pressurized and vulcanized at a pressure of 1.2 MPa or more.

The unvulcanized rubber sheet for compression rubber layer may be prepared by rolling an unvulcanized rubber sheet with a calender roll to form the unvulcanized rubber sheet for inner rubber layer which forms a frictional power transmission surface, and laminating the unvulcanized rubber sheet for inner rubber with the unvulcanized rubber sheet for outer rubber layer on the calender roll The above production method may further include: disposing the unvulcanized laminate which is a hollow cylindrical or sleeve-shaped unvulcanized laminate including: an unvulcanized rubber laminated sheet for forming a belt body at least including the unvulcanized rubber sheet for compression rubber layer and an unvulcanized rubber sheet for tension rubber layer laminated or disposed on one surface of the unvulcanized rubber sheet for compression rubber layer; a cord embedded in a longitudinal direction of the unvulcanized rubber laminated sheet; and the fabric which is a knitted fabric laminated or disposed on the other surface of the unvulcanized rubber sheet for compression rubber layer, so that the knitted fabric is directed toward a rib mold of the outer mold; and pressurizing and vulcanizing the unvulcanized rubber laminated sheet with an expansion pressure of a flexible jacket that is mounted on the inner mold and is expandable and contractile.

In the present description, the Mooney Scorch minimum viscosity of a rubber composition may be indicated by "Vm", and unless otherwise specified, the Mooney Scorch minimum viscosity "Vm" indicates a value at a temperature of 125° C. Further, an acrylic monomer and a methacrylic monomer may be collectively referred to as a (meth)acrylic monomer. A numerical range "XX to YY" means that the numerical range includes the numerical value "XX" and the numerical value "YY", that is, the numerical range is equal to the numerical value "XX" or more and the numerical value "YY" or less.

Advantageous Effects of Invention

In the present invention, since the compression rubber layer is formed of the inner rubber layer having a specific Mooney Scorch minimum viscosity (a minimum value of Mooney viscosity) and in contact with the fabric and the outer rubber layer having a specific Mooney Scorch minimum viscosity on the outer peripheral side of the inner rubber layer, it is possible to produce the V-ribbed belt easily and efficiently which can prevent the rubber of the belt body from bleeding out to the frictional power transmission surface and can improve the sound emission resistance, even when the molded body is pressurized and molded in the vulcanization step. In addition, the rib portion can be formed with high accuracy. Further, by prescribing the rubber composition and treating the fabric, the wear resistance of the fabric (such as a knitted fabric) can be improved, and the sound emission resistance during water injection can be maintained for a long period of time. Furthermore, the rubber can be prevented from bleeding out to the frictional power transmission surface and the durability can be greatly improved even when the V-ribbed belt is produced using a cord having a high tensile elastic modulus and the molded body is pressurized at high pressure in the vulcanization step.

DESCRIPTION OF EMBODIMENTS

Hereinafter, a V-ribbed belt of the present invention will be described in detail with reference to the accompanying drawings, if necessary.

V-Ribbed Belt

Figure 1:
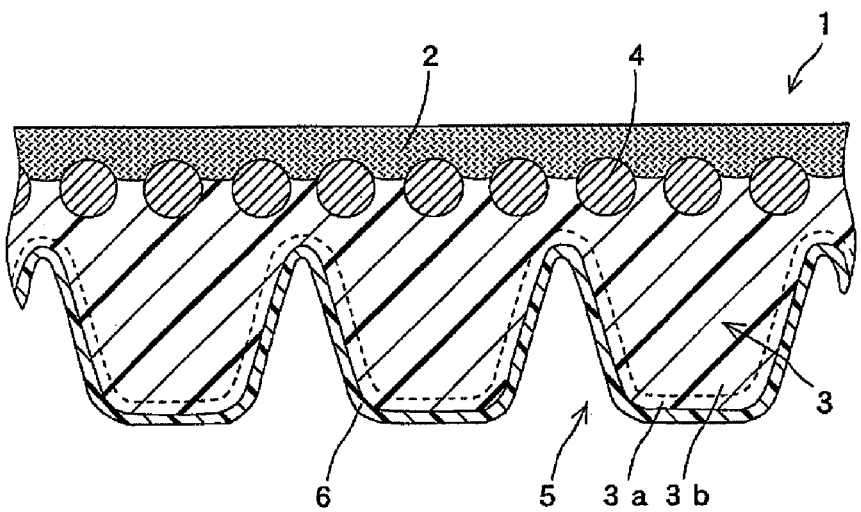
FIG. 1 is a schematic cross-sectional view illustrating an example of a V-ribbed belt according to the present invention.

FIG. 1 shows a V-ribbed belt 1 which is an example of the present invention. The V-ribbed belt 1 includes a belt body including a tension layer (tension rubber layer in this example) 2 forming a belt back surface (outer peripheral surface of the belt), and a compression rubber layer 3 laminated on an inner peripheral surface of the tension rubber layer. Cords 4 extending in a longitudinal direction (circumferential length direction) of the belt are embedded between the compression rubber layer 3 and the tension rubber layer 2 so as to be arranged side by side at predetermined intervals in a belt width direction. In addition, a plurality of rib portions 5 each having an inverted V-shaped (inverted trapezoidal) cross section are formed on a belt inner peripheral surface of the compression rubber layer 3 by a plurality of V-shaped grooves extending in the longitudinal direction (circumferential length direction) at intervals in the width direction, so as to form the V-ribbed belt. In the V-ribbed belt, two inclined surfaces (two inclined side walls) on both side portions of the rib portions 5 form a frictional power transmission surface. A knitted fabric 6 as a fabric is laminated on the surface of the rib portions 5 as a frictional power transmission surface. The frictional power transmission surface can be brought into contact with a pulley (a pulley having groove portions with which the knitted fabric on both side walls of the rib portions 5 can be brought into contact) via the knitted fabric 6. In this example, the cord (cord body) 4 is formed of a twisted cord, is in contact with the tension rubber layer 2 and the compression rubber layer 3, and is interposed between the two rubber layers 2 and 3.

The compression rubber layer 3 has a two-layer structure including an inner rubber layer (inner layer or rubber layer in contact with and adhered to the knitted fabric 6) 3a and an outer rubber layer (outer layer or rubber layer adhered to the tension rubber layer 2) 3b. The inner rubber layer 3a is formed of a rubber composition having a Mooney Scorch minimum viscosity Vm lower than that of a rubber composition forming the outer rubber layer 3b. In this example, the outer rubber layer (outer layer) 3b is formed of a rubber composition having a Vm of about 70 to 130, and the inner rubber layer (inner layer) 3a is formed of a rubber composition having a Vm of about 50 to 110. Further, in this example, the thickness of the V-ribbed belt 1 is about 3 mm to 6 mm, and the thickness of the compression rubber layer 3 (thickness to the top of the rib portion) is about 1 mm to 10 mm. The thickness of the inner rubber layer (inner layer) 3a is smaller than that of the outer rubber layer (outer layer) 3b, and is formed to have a thickness of about 0.03 mm to 0.5 mm. That is, the inner rubber layer 3a is formed to have a thickness of about 1% to 50% with respect to the thickness of the compression rubber layer 3 (thickness to the top of the rib portion).

Thus, in the V-ribbed belt, since the Vm value of the rubber composition forming the inner rubber layer (inner layer) 3a of the compression rubber layer 3 is adjusted to a specific range, it is possible to prevent the rubber or the composition thereof from penetrating structures of the knitted fabric 6 and from bleeding out to the frictional power transmission surface, and it is possible to improve the sound emission resistance. In addition, since the thickness of the inner rubber layer (inner layer) 3a is small, and the Vm of the rubber composition forming the outer rubber layer (outer layer) 3b is also adjusted to a specific range, the durability of the belt is improved, and the rib portion can be formed with high accuracy.

Further, since the compression rubber layer 3 has a two-layer structure, the man-hours for producing the belt can be reduced and the productivity can be improved as compared with a case of forming a compression rubber layer with a large number of rubber layers. Furthermore, since the frictional power transmission surface is covered with the knitted fabric 6, the power friction transmission properties can be stabilized, and the generation of abnormal noise can be prevented even when it is exposed to water and/or it is deteriorated. Moreover, the sound emission limit tension can be reduced, and sound emission (abnormal noise) can be effectively prevented and sound emission resistance can be improved even when the belt tension is low.

The V-ribbed belt of the present invention is not limited to the V-ribbed belt having the structure shown in the above figure. For example, the tension layer may be formed of a fabric (cover canvas made of fiber members such as woven fabrics, knitted fabrics, and non-woven fabrics) instead of the tension rubber layer (rubber composition), and a fabric (canvas) may be laminated on the outer peripheral surface of the tension rubber layer. An adhesion rubber layer may be interposed between the compression rubber layer and the tension layer (or tension rubber layer). The cord may be embedded in this adhesion rubber layer. In addition, the cord may be embedded between the compression rubber layer and the tension layer (or tension rubber layer). For example, the cord may be embedded in the compression rubber layer, or may be embedded in the compression rubber layer while being in contact with the tension layer. The cord may be embedded in the adhesion rubber layer, or may be embedded between the compression rubber layer and the adhesion layer or between the adhesion rubber layer and the tension layer. Further, if necessary, a fabric (canvas) may be laminated on the compression rubber layer via a rubber layer, but usually, a fabric (fiber member such as a knitted fabric) is directly laminated on the compression rubber layer.

In a preferred example, the rib portion extending in the longitudinal direction (circumferential length direction) is formed on the inner peripheral surface of the compression rubber layer, and the surface of the rib portion is directly covered with the fabric. A preferred V-ribbed belt includes: a tension layer for forming the outer peripheral surface of the belt (or an tension rubber layer in which a fabric may be laminated on the outer peripheral surface); a compression rubber layer laminated on the inner peripheral surface of the tension layer; a cord extending spirally in the longitudinal direction (circumferential length direction) of the belt and embedded between the tension layer and the compression rubber layer; a plurality of rib portions formed on the inner peripheral surface of the compression rubber layer at intervals in the width direction and extending in the longitudinal direction (inner peripheral direction); and a fabric covering the inner peripheral surface including the rib portions (frictional power transmission surface including both side walls of each rib portion), in which the cord may be embedded in an adhesion rubber layer interposed between the tension layer and the compression rubber layer.

A V-belt is a frictional power transmission belt that transmits friction by bringing both side walls of the belt into contact with the V-shaped inner wall of the pulley. For example, in a variable speed V-belt (raw-edge cogged V-belt) described in JP-A-H09-317831, cog portions extending in the width direction are formed at intervals in the longitudinal direction in order to improve the bendability. In such a V-belt (variable speed belt), both side walls of the belt serve as frictional power transmission surfaces, and the contact area between the bottom fabric disposed on the lower surface of the compression rubber layer and the V-shaped inner wall of the pulley is extremely small. In contrast, in the V-ribbed belt, the fabric on both side walls of the rib portion comes into direct contact with both side walls of the V-shaped groove (usually, a plurality of V-shaped grooves formed at intervals in the width direction) of the pulley to transmit power. Therefore, in the V-ribbed belt, when rubber bleeds out from the fabric on both side walls (frictional power transmission surface) of the rib portion, the power friction transmission properties become unstable and sound is generated. Thus, unlike the V-belt, which has an extremely small contact area between both side walls of the V-shaped groove of the pulley and the bottom fabric, in the V-ribbed belt, the fabric on both side walls of the rib portion comes into direct contact with the V-shaped groove of the pulley over a large area. Therefore, the bleeding-out of the rubber from the fabric greatly influences the sound emission property of the belt during running.

Hereinafter, each member constituting the V-ribbed belt and a method for producing the V-ribbed belt is described in detail.

Fabric

By covering the frictional power transmission surface of the compression rubber layer with a fabric, the durability and the sound emission resistance of the V-ribbed belt can be improved. In particular, the power friction transmission properties can be stabilized, and the sound emission resistance can be improved even when the belt tension is low. As the fabric, fiber members such as a woven fabric (woven member), a knitted fabric (knitted member), and a non-woven fabric can be used, and a knitted fabric (or canvas) is often used. The knitted fabric is formed of water-absorbent fibers and/or non-water-absorbent fibers. From the viewpoints of improving the sound emission resistance when exposed to water, a knitted fabric formed of water-absorbent fibers (or hydrophilic fibers) and non-water-absorbent fibers (for example, the knitted fabric described in JP-A-2016-70494) is used.

Examples of the water-absorbent fibers or the hydrophilic fibers (or fibers containing water-absorbent yarns) include vinyl alcohol-based fibers (polyvinyl alcohol, ethylene-vinyl alcohol polymer fibers, vinylon, etc.), polyamide fibers (aliphatic polyamide fibers such as polyamide 6 fibers, polyamide 66 fibers, polyamide 46 fibers, etc.), cellulose-based fibers [cellulose fibers (cellulose fibers derived from plants such as cotton and hemp, animals or bacteria), fibers of cellulose derivatives such as rayon and acetate], and animal-derived fibers (wool, silk, etc.). These water-absorbent fibers can be used alone or in combination of two or more thereof. Among these water-absorbent fibers, cellulose fibers (particularly cotton fibers) are preferred.

The cellulose-based fibers may be spun yarns. The thickness (yarn count) of the cellulose-based fibers is, for example, about 5 to 100, preferably about 10 to 80, and more preferably about 20 to 70 (particularly, about 30 to 50). When the thickness is too small, the mechanical properties of the knitted fabric may decrease, and when the thickness is too large, the water absorbency may decrease. Preferred cellulose-based fibers are cellulose fibers.

Examples of the non-water-absorbent fiber include: synthetic fibers such as polyolefin fibers polyolefin fibers (polyethylene fibers (including high-strength polyethylene fibers), polypropylene fibers, etc.), non-absorbent polyamide fibers (aromatic polyamide fibers such as aramid fibers), acrylic fibers, polyester fibers [$C_{2-4}$ alkylene $C_{6-14}$ allylate fibers such as polyethylene terephthalate (PET) fibers, polypropylene terephthalate (PPT) fibers, polytrimethylene terephthalate (PTT) fibers, polybutylene terephthalate (PBT) fibers, and polyethylene naphthalate (PEN) fibers, and polyarylate fibers], polyparaphenylene benzobisoxazole (PBO) fibers, and polyurethane fibers; and inorganic fibers such as carbon fibers. These non-water-absorbent fibers can be used alone or in combination of two or more thereof. Among these non-water-absorbent fibers, composite fibers (composite yarns), for example, composite fibers of synthetic fibers (composite yarns of synthetic fibers) may be used, and in order to improve the wear resistance of the knitted fabric and prevent the rubber from bleeding out to the frictional power transmission surface (or the surface of the knitted fabric), bulky textured yarns or bulky composite yarns (such as polyester-based composite yarns such as PTT/PET conjugate yarns) having a large cross-sectional bulk are preferred.

The fineness of the non-water-absorbent fibers may be, for example, about 20 dtex to 600 dtex, preferably about 50 dtex to 300 dtex, and more preferably about 60 dtex to 200 dtex (particularly about 70 dtex to 100 dtex).

The fabric (knitted fabric, etc.) preferably contains at least water-absorbent fibers (particularly cellulose-based fibers). The proportion of the non-water-absorbent fibers may be selected from the range of, for example, 200 parts by mass or less (for example, 0 to 200 parts by mass) with respect to 100 parts by mass of the water-absorbent fibers, and is, for example, about 1 to 100 parts by mass, preferably about 3 to 80 parts by mass (for example, 5 to 50 parts by mass), and more preferably about 10 to 40 parts by mass (particularly 20 to 30 parts by mass). When the proportion of the non-water-absorbent fibers is too large, the water absorbency of the knitted fabric may decrease, and the sound emission resistance when exposed to water may decrease.

The structure of the knitted fabric is not particularly limited, and a common structure can be used. A single layer weft knit [for example, a weft knit in which a flat knit (plain knit) is used as a knitted structure] or a multilayer knitted fabric [for example, a moss stitch knit (a weft knit in which a moss stitch knit is used as a knitted structure)] is preferred, and a multilayer knitted fabric is particularly preferred. In the multilayer knitted fabric, the number of layers of the knitted fabric may be, for example, 2 to 5, preferably 2 to 4, and more preferably 2 or 3.

The density of fibers or yarns of the knitted fabric may be, for example, 30 fibers or yarns/inch or more (for example, 32 to 70 fibers or yarns/inch, preferably 34 to 60 fibers or yarns/inch, and more preferably 35 to 55 fibers or yarns/inch) in each of a wale direction and a course direction. In addition, the total density of fibers or yarns may be 60 fibers/inch or more (for example, 62 to 120 fibers or yarns/inch, preferably 70 to 115 fibers or yarns/inch, more preferably 80 to 110 fibers or yarns/inch, and particularly preferably 90 to 105 fibers or yarns/inch).

The bulkiness range of the fabric or fiber member (for example, a knitted fabric in which a composite yarn such as a bulky textured yarn as a synthetic fiber is knitted) can be selected within a range in which bleeding-out of the rubber can be prevented, and may be, for example, about 2 to 4.5 $cm^3/g$ (for example, 2.2 to 4 $cm^3/g$), preferably about 2.3 to 3.8 $cm^3/g$ (for example, 2.4 to 3.5 $cm^3/g$), and more preferably about 2.5 to 3.3 $cm^3/g$. The bulkiness ($cm^3/g$) can be calculated by dividing the thickness (cm) of the knitted fabric by the mass per unit area ($g/cm^2$).

The fabric (knitted fabric, etc.) may have a basis weight of, for example, about 50 to 500 $g/m^2$, preferably about 80 to 400 $g/m^2$, and more preferably about 100 to 350 $g/m^2$.

The thickness (average thickness) of the fabric (knitted fabric, etc.) can be selected from the range of about 0.1 mm to 5 mm, and may be, for example, about 0.3 mm to 3 mm (for example, 0.4 mm to 2 mm), and preferably about 0.5 mm to 1.5 mm (for example, 0.7 mm to 1.2 mm).

In order to improve the adhesiveness to the frictional power transmission surface, the fabric (knitted fabric, etc.) may be subjected to an adhesion treatment, if necessary. The adhesion treatment can also improve the wear resistance of the frictional power transmission surface (power transmission surface). Examples of the adhesion treatment include: a method of immersing in a treatment liquid obtained by dissolving an adhesive component (for example, an epoxy compound or an isocyanate compound) in an organic solvent (toluene, xylene, methyl ethyl ketone, etc.) and then performing heating and drying; and a method of immersing in a resorcin-formalin-latex liquid (RFL treatment liquid) and then performing heating and drying. These methods can be performed alone or in combination, and the treatment order and the number of treatments are not limited. For example, the fabric (knitted fabric, etc.) may be pretreated with an epoxy compound and/or an isocyanate compound, immersed in an RFL treatment liquid, and then heat-dried.

Isocyanate Compound

When the fabric is treated (impregnated or adhered) with at least an isocyanate compound (polyisocyanate compound), the adhesiveness to the rubber composition and the wear resistance of the fabric are improved, and the sound emission resistance can be maintained for a long period of time. In particular, when the rubber component of the compression rubber layer and/or the fiber (water-absorbent or hydrophilic fibers such as cellulose-based fibers) of the fabric has a functional group reactive with an isocyanate compound (for example, an organic group having an active hydrogen atom such as a hydroxy group, a carboxyl group, or an amino group), by treating the fabric with the isocyanate compound, the mechanical properties of the fabric, the adhesiveness to the compression rubber layer, and the wear resistance and the durability of the V-ribbed belt can be further improved, and the sound emission resistance can be maintained for a long period of time. The fabric may be treated with an isocyanate compound in combination with a resorcin-formalin-latex liquid (RFL liquid) and/or an epoxy resin widely used as a fabric treatment agent, but the adhesiveness and mechanical properties can be improved without the treatment with the RFL liquid and/or the epoxy resin.

The isocyanate compound has a reactive isocyanate group, and usually, a polyisocyanate having a plurality of isocyanate groups in one molecule (for example, diisocyanate) is often used. Examples of the polyisocyanate include: aliphatic polyisocyanates [diisocyanates such as propylene diisocyanate, trimethylene diisocyanate, tetramethylene diisocyanate, hexamethylene diisocyanate (HDI), trimethylhexamethylene diisocyanate (TMDI), and lysine diisocyanate (LDI), and tri- or polyisocyanates such as 1,6,11-undecanetriisocyanate methyloctane and 1,3,6-hexamethylene triisocyanate]; alicyclic polyisocyanates [diisocyanates such as cyclohexane 1,4-diisocyanate, isophorone diisocyanate (IPDI), hydrogenated xylylene diisocyanate, and hydrogenated bis(isocyanatophenyl)methane, and tri- or polyisocyanates such as bicycloheptane triisocyanate]; and aromatic polyisocyanates [diisocyanates such as phenylene diisocyanate, tolylene diisocyanate (TDI), xylene diisocyanate (XDI), tetramethylxylene diisocyanate (TMXDI), naphthalene diisocyanate (NDI), bis(isocyanatophenyl)methane (MDI), toluidine diisocyanate (TODI), and 1,3-bis(isocyanatophenyl)propane, and tri- or polyisocyanates].

These polyisocyanates may be derivatives such as multimers (dimers, trimers, tetramers, etc.), adducts, modified products (biuret modified products, alohanate modified products, urea modified products, etc.), or urethane oligomers having a plurality of isocyanate groups. Examples of the modified product or derivative of the polyisocyanate include: an adduct of a polyisocyanate (an aliphatic polyisocyanate such as hexamethylene diisocyanate) and a polyhydric alcohol (such as trimethylolpropane and pentaerythritol); a biuret of the polyisocyanate; and a multimer of the polyisocyanate (for example, an aliphatic polyisocyanate) (for example, a polyisocyanate having an isocyanurate ring such as a trimer of hexamethylene diisocyanate).

These isocyanate compounds can be used alone or in combination of two or more thereof. Among these isocyanate compounds (particularly polyisocyanates), aliphatic polyisocyanates and derivatives thereof (for example, HDI and a trimer thereof), aromatic polyisocyanates (TDI, MDI, etc.), or the like are widely used.

Further, the isocyanate compound may be a general-purpose isocyanate compound having a free isocyanate group (isocyanate compound not protected by a blocking agent), but it is preferable to use a heat-reactive isocyanate compound (or blocked polyisocyanate) in which the isocyanate group is protected with a blocking agent. When a heat-reactive isocyanate compound is used, in the process of molding the belt, the isocyanate group is protected by the blocking agent and is thus inactive and does not participate in curing, so that the tension ability (formability) of the fabric is not hindered; and in the process of vulcanizing the belt, the blocking agent is dissociated, the isocyanate group is activated and reacts with the reactor of the fabric for curing, and the wear resistance can be improved. Therefore, when a heat-reactive isocyanate compound is used, the adhesiveness of the fabric and the wear resistance and the durability of the V-ribbed belt can be improved without lowering the productivity of the belt, and the sound emission resistance when exposed to water can be maintained for a long period of time. Further, when an aqueous immersion liquid containing an isocyanate compound is prepared, the liquid preparation is simpler and the environmental load is smaller than that of the RFL liquid.

As the heat-reactive isocyanate compound, a commonly used heat-reactive polyisocyanate can be used. Examples of the blocking agent (protective agent) include $C_{1-24}$ monoalcohols such as methanol, ethanol, and isopropanol, or alkylene oxide adducts thereof (for example, $C_{2-4}$ alkylene oxide adducts such as ethylene oxide); phenols such as phenol, cresol, and resorcin; oximes such as acetoxime, methylethylketoxime, and cyclohexaneoxime; lactams such as ε-caprolactam and valerolactam; and secondary amines such as dibutylamine and ethyleneimine. These blocking agents can be used alone or in combination of two or more thereof. Among these, oximes, lactams, or the like are widely used. The form of the heat-reactive isocyanate compound is not particularly limited and may be in the form of a liquid or powder, or may be in the form of containing an aqueous or organic solvent (aqueous solution or dispersion, or organic solvent solution).

The content of the isocyanate group of the isocyanate compound (heat-reactive isocyanate compound, etc.) is not particularly limited, and is, for example, about 1 wt % to 50 wt %, preferably about 3 wt % to 40 wt %, and more preferably about 5 wt % to 30 wt %.

The dissociation temperature (temperature at which the blocking agent dissociates and the active isocyanate group regenerates) of the heat-reactive isocyanate compound may be equal to or higher than the heating temperature in the belt molding step before the vulcanization step of the rubber component (generally equal to or higher than the drying temperature of the fabric impregnated with the liquid composition by immersion) and may be equal to or lower than the vulcanization temperature of the rubber component. When the dissociation temperature is high, the drying temperature can be raised, so that the productivity can be improved. The dissociation temperature may be, for example, 120° C. or higher (preferably 150° C. or higher, and more preferably 180° C. or higher), and is, for example, about 120° C. to 250° C. (for example, 150° C. to 240° C.), preferably about 160° C. to 230° C. (for example, 170° C. to 220° C.), and more preferably about 175° C. to 210° C. (particularly 180° C. to 200° C.). When the dissociation temperature is too low, the drying temperature cannot be raised, and thus it takes time to dry, which may reduce the productivity.

The present form of the isocyanate compound may be any form in which at least a part of the fibers forming the fabric is coated or adhered. The distribution region of the isocyanate compound may be either the surface of the fabric or between the fibers inside the fabric. In order to improve the wear resistance, it is preferable that the isocyanate compound is distributed substantially uniformly (particularly uniformly) over the entire fabric including the fibers inside the fabric (entangled porous structure). By immersing the fabric in a liquid composition containing the isocyanate compound, the isocyanate compound can be easily and uniformly distributed over the entire fabric.

The proportion of the isocyanate compound may be about 1 mass % to 30 mass % in the fabric, and from the viewpoints of maintaining the flexibility of the fabric, improving the adhesiveness and the wear resistance, and maintaining the sound emission resistance when exposed to water for a long period of time, may be, for example, about 3 mass % to 20 mass %, preferably about 5 mass % to 18 mass % (for example, 7 mass % to 15 mass %), and more preferably about 10 mass % to 15 mass % (for example, 11 mass % to 13 mass %). When the proportion of the isocyanate compound is too small, the adhesiveness and the wear resistance are not improved so much, and the sound emission resistance when exposed to water may be lowered. On the contrary, when the proportion is too large, the flexibility of the fabric or the belt may be lowered.

The fabric (knitted fabric, etc.) may contain commonly used additives such as a surfactant, a dispersant, a filler, a colorant, a stabilizer, a surface treatment agent, and a leveling agent on the fiber surface or inside the fibers. As the surfactant, for example, a hydrophilic plasticizer (hydrophilic treatment agent) described later can be used. These additives can be used alone or in combination of two or more thereof. The proportion of the additive may be 10 mass % or less, for example, about 0.01 mass % to 5 mass %, preferably about 0.1 mass % to 3 mass %, and more preferably about 0.5 mass % to 2 mass % with respect to the entire fabric (knitted fabric, etc.). The treated amount (content) of the surfactant may be about 0.1 g to 200 g (for example, 1 g to 150 g), and preferably about 3 g to 100 g (for example, 5 g to 60 g) per 1 $m^2$ of the fabric.

Inner Layer of Compression Rubber Layer

Examples of a rubber component of an unvulcanized rubber composition forming the inner layer (inner rubber layer) include diene rubbers (natural rubber, isoprene rubber, butadiene rubber, chloroprene rubber, butyl rubber, styrene-butadiene rubber (SBR), vinylpyridine-styrene-butadiene rubber, acrylonitrile-butadiene rubber (nitrile rubber: NBR), acrylonitrile-chloroprene rubber, hydride nitrile rubber (1-INBR), etc.), ethylene-α-olefin elastomers, chlorosulfonated polyethylene rubbers (CSM), alkylated chlorosulfonated polyethylene rubbers (ACSM), epichlorohydrin rubbers, acrylic rubbers, silicone rubbers, urethane rubbers, and fluororubbers. These rubber components may be carboxylated, such as carboxylated SBR and carboxylated NBR. These rubber components can be used alone or in combination of two or more thereof.

A preferred rubber component contains at least an ethylene-α-olefin elastomer (or ethylene-α-olefin rubber) such as an ethylene-propylene copolymer (EPM) and an ethylene-propylene-diene ternary copolymer (EPDM) as a main component. These ethylene-α-olefin elastomers can be used alone or in combination of two or more thereof.

Further, an ethylene-propylene-diene ternary copolymer such as EPDM is preferred from the viewpoint of obtaining excellent heat resistance, cold resistance, and durability.

The diene content of the ethylene-α-olefin elastomer is, for example, about 0.5 mass % to 3.5 mass %, preferably about 1 mass % to 3 mass %, and more preferably about 1.5 mass % to 2.8 mass % (particularly 2 mass % to 2.5 mass %). When the diene content is too small, the crosslinking density may decrease and the strength of the rubber may decrease. On the contrary, when the diene content is too large, the Mooney viscosity may decrease and the sound emission resistance may decrease. Within the description and claims, the diene content can be measured according to the standard assay method of ASTM D6047.

The rubber component may be formed only of an ethylene-α-olefin elastomer (or ethylene-α-olefin rubber), and in order to adjust Vm, an ethylene-α-olefin elastomer (or ethylene-α-olefin rubber) as a first rubber component may be combined with another rubber component (second rubber component). The proportion of the second rubber component may be 50 parts by mass or less (for example, about 1 to 40 parts by mass, and preferably about 5 to 30 parts by mass) with respect to 100 parts by mass of the ethylene-α-olefin elastomer (first rubber component).

From the viewpoints of being capable of preventing the rubber composition from bleeding out to the frictional power transmission surface through the fabric (knitted fabric, etc.) and improving the sound emission resistance, the Mooney viscosity (ML(1+4) 125° C.) of an unvulcanized rubber (ethylene-α-olefin elastomer, etc.) may be, for example, about 20 to 80 (for example, 25 to 70), and is generally about 30 to 65 (for example, 35 to 63), and preferably about 40 to 60 (for example, 45 to 55). The Mooney viscosity of the unvulcanized rubber (such as ethylene-α-olefin elastomer) may be a mixture of a plurality of rubber components having different Mooney viscosities. In the present description and claims, the Mooney viscosity can be measured by a method according to JIS K6300-1 (2013), and the test conditions include an L-shaped rotor, a test temperature of 125° C., a preheating time of 1 minute, and a rotor operating time of 4 minutes.

The proportion of the ethylene-α-olefin elastomer to the entire inner layer (or the total amount of the rubber composition) may be, for example, about 20 mass % or more (for example, about 25 mass % to 80 mass %), preferably about 35 mass % to 75 mass % (for example, 40 mass % to 70 mass %), and more preferably about 45 mass % to 65 mass % (for example, 50 mass % to 60 mass %).

Reinforcing Agent (Reinforcing Filler)

The rubber composition forming the inner layer may contain carbon black and/or silica as a reinforcing agent (reinforcing filler). When such a reinforcing agent is added, the Vm of the rubber composition can be increased, and the Vm of the rubber composition can be adjusted by the type and amount of the reinforcing agent added.

The carbon black is classified into "N0" to "N9" by ASTM (classified based on the iodine adsorption amount), and, in the related art, is classified into SAF, HAF, GPF, etc. based on the performance of rubber products. N110 (SAF), N220 (ISAF), N330 (HAF) and the like which have a small primary particle diameter, are sometimes called hard carbon, and N550 (FEF), N660 (GPF), N762 (SRF) and the like having a large primary particle diameter are sometimes referred to as soft carbon.

The average particle diameter (average primary particle diameter) of carbon black may be, for example, about 5 nm to 200 nm (for example, 10 nm to 150 nm), preferably about 15 nm to 120 nm (for example, 20 nm to 100 nm), and more preferably about 25 nm to 100 nm (for example, 30 nm to 80 nm). When the average particle diameter of carbon black is too small, the torque loss may become large, and when the average particle diameter is too large, the mechanical properties of the belt body may deteriorate. The carbon black can be used alone or in combination.

In many cases, at least carbon black (hard carbon) having a small primary particle diameter is used as the carbon black to improve the reinforcing property for rubber, the hardness and the wear resistance of the rubber, and the durability of the belt (power transmission property under high load). The average primary particle diameter of carbon black (hard carbon) may be, for example, about 10 nm to 35 nm, preferably about 15 nm to 33 nm, and more preferably about 20 nm to 32 nm (particularly 25 nm to 30 nm). When the average primary particle diameter is too small, the hard carbon may be difficult to prepare, and when the average primary particle diameter is too large, the effect of improving power transmission under high load may be reduced.

The carbon black may contain soft carbon having a primary particle diameter of 40 nm or more in order to prevent heat generation when the belt is bent and to reduce torque loss. The average primary particle diameter of the soft carbon may be, for example, 300 nm or less, preferably 200 nm or less, and more preferably 100 nm or less. The average primary particle diameter of the soft carbon may be, for example, about 45 nm to 200 nm, preferably about 50 nm to 150 nm, and more preferably about 55 nm to 100 nm (particularly 60 nm to 100 nm). When the average primary particle diameter of the soft carbon is too small, the effect of reducing the torque loss may be reduced, and when the average primary particle diameter is too large, the reinforcing property may be lowered and power transmission under high load may be difficult.

The iodine adsorption amount of the carbon black may be, for example, about 5 mg/g to 200 mg/g (for example, 10 mg/g to 150 mg/g), and preferably about 12 mg/g to 130 mg/g (for example, 20 mg/g to 100 mg/g).

The iodine adsorption amount of the hard carbon may be 60 mg/g or more, for example, about 60 mg/g to 150 mg/g, preferably about 65 mg/g to 130 mg/g, and more preferably about 70 mg/g to 100 mg/g (particularly 75 mg/g to 90 mg/g). When the iodine adsorption amount is too small, the effect of improving the power transmission under high load may be reduced, and when the iodine adsorption amount is too large, the hard carbon may be difficult to prepare.

The iodine adsorption amount of the soft carbon may be less than 60 mg/g, for example, about 10 mg/g or more and less than 60 mg/g, preferably about 15 mg/g to 50 mg/g, and more preferably about 18 mg/g to 40 mg/g (particularly 20 mg/g to 30 mg/g). When the iodine adsorption amount is too small, the reinforcing property of the carbon black may be lowered and power transmission under high load may be difficult, and on the contrary, when the iodine adsorption amount is too large, the effect of reducing the torque loss may be reduced.

The mass ratio of the hard carbon to the soft carbon can be selected from the range of, for example, the former/the latter=100/0 to 10/90 (for example, 70/30 to 20/80), and may be about 90/10 to 30/70, and preferably about 80/20 to 40/60.

The silica includes dry silica, wet silica, and surface-treated silica. Further, the silica can be classified into, for example, dry method white carbon, wet method white carbon, colloidal silica, precipitated silica and the like depending on the production method. These silicas can be used alone or in combination of two or more thereof. Among these silicas, silica having a surface silanol group (silicic acid anhydride, hydrous silicic acid) is preferred, and hydrous silicic acid having a large amount of surface silanol groups has a strong chemical bonding force with the rubber component.

The average particle diameter (average primary particle diameter) of the silica may be, for example, about 1 nm to 500 nm (for example, 3 nm to 300 nm), and preferably about 5 nm to 100 nm (for example, 10 nm to 50 nm). When the particle diameter of the silica is too large, the reinforcing property of the belt body may decrease, and when the particle diameter is too small, it may be difficult to disperse uniformly.

The nitrogen adsorption specific surface area of the silica according to the BET method may be, for example, about 50 to 400 m$^2$/g (for example, 70 to 300 m$^2$/g), and preferably about 100 to 250 m$^2$/g (for example, 150 to 200 m$^2$/g). When the specific surface area is too large, torque loss is likely to occur and it may be difficult to disperse uniformly, and when the specific surface area is too small, the reinforcing property for rubber may decrease.

As these reinforcing fillers, commercially available fillers can be used as reinforcing agents for rubber.

The proportion of the reinforcing agent (reinforcing filler) can be selected according to the Vm of the rubber composition, and may be about 30 parts by mass or more (for example, 30 to 170 parts by mass), preferably about 35 to 150 parts by mass (for example, 40 to 120 parts by mass), and more preferably about 45 to 100 parts by mass (for example, 50 to 100 parts by mass), with respect to 100 parts by mass of the rubber (unvulcanized rubber such as ethylene-α-olefin elastomer) forming the inner layer. More specifically, the proportion of the carbon black can be selected according to the Vm of the rubber composition, and may be about 30 parts by mass or more (for example, 30 to 150 parts by mass), preferably about 35 to 120 parts by mass (for example, 40 to 110 parts by mass), and more preferably about 45 to 100 parts by mass (for example, 50 to 80 parts by mass), and may be about 35 to 70 parts by mass (for example, 40 to 60 parts by mass), with respect to 100 parts by mass of the rubber component (unvulcanized rubber such as ethylene-α-olefin elastomer) forming the inner layer. As the proportion of the carbon black increases, the Vm of the rubber composition tends to increase. When the proportion of the carbon black is too small, the mechanical strength of the belt may decrease, and when the carbon black is too large, it may be difficult to disperse uniformly.

In addition, the proportion of the silica may be about 0 to 50 parts by mass (for example, 1 to 30 parts by mass), preferably about 3 to 25 parts by mass, and more preferably about 5 to 15 parts by mass (for example, 5 to 10 parts by mass), with respect to 100 parts by mass of the rubber component (unvulcanized rubber such as ethylene-α-olefin elastomer) forming the inner layer. When the blending amount of the reinforcing filler is too large, the torque loss may become large, and when the amount of the reinforcing filler is too small, the reinforcing property for the rubber may decrease.

In the present description and claims, the primary particle diameter of the reinforcing filler (carbon black and silica) can be calculated as an arithmetic average particle size of an appropriate number of samples (for example, 50 samples) by, for example, image analysis of an electron micrograph including a transmission electron microscope and a scanning electron microscope. In addition, the iodine adsorption amount of the carbon black can be measured according to the standard test method of ASTM D1510. There is a close relationship between the iodine adsorption amount and the primary particle diameter, and the smaller the primary particle diameter, the larger the iodine adsorption amount tends to be.

Hydrophilic Plasticizer

The rubber composition forming the inner layer may contain a hydrophilic plasticizer (hydrophilic treatment agent or surfactant). When the rubber composition (inner layer) contains a hydrophilic plasticizer (or a hydrophilic agent), since the hydrophilic plasticizer gradually bleeds out to the frictional power transmission surface with the passage of time, the water absorbency of the fabric can be increased and the sound emission resistance during water injection can be improved. In Patent Literature 2, a hydrophilic treatment agent (surfactant) is adhered to the fabric to increase the water absorbency and to improve the sound emission resistance during water injection. However, in this method, the number of treatment steps (spraying, coating, dipping, application and drying steps) for adhering the hydrophilic plasticizer (hydrophilic treatment agent or surfactant) to the fabric has increased, and the productivity is decreased. Also, the hydrophilic plasticizer (hydrophilic treatment agent) adhering to the fabric may flow out relatively easily upon contact with water, and the sound emission resistance during water injection may disappear within a short period of time. In contrast, when the hydrophilic plasticizer is contained in the rubber composition, the hydrophilic plasticizer does not flow out within a short period of time, and high sound emission resistance during water injection can be maintained for a long period of time. Further, since the rubber composition may be blended with the hydrophilic plasticizer, it is not necessary to provide a new step, the number of man-hours can be reduced, and the productivity can be improved.

When the rubber composition forming the inner layer contains a hydrophilic plasticizer (hydrophilic agent or surfactant), and the water-absorbent fiber of the fabric is combined with the hydrophilic plasticizer (hydrophilic agent or surfactant), the hydrophilic plasticizer that bleeds out to the frictional power transmission surface reduces the surface tension of water droplets adhering to the frictional power transmission surface. Therefore, it is possible to spread water droplets to improve the wettability on the frictional power transmission surface, and to improve the water absorption efficiency and sound emission resistance during water injection by the water-absorbent fiber.

Examples of the hydrophilic plasticizer (or surfactant) include an ionic surfactant (anionic surfactant, cationic surfactant, and amphoteric surfactant), and a nonionic surfactant. The nonionic surfactant may be, for example, a polyethylene glycol type (polyoxyethylene type) nonionic surfactant and a polyhydric alcohol type nonionic surfactant.

The polyethylene glycol type nonionic surfactant is a nonionic surfactant in which ethylene oxide is added to a hydrophobic base component having a hydrophobic group, such as a higher alcohol, an alkyl phenol, a higher fatty acid, a polyhydric alcohol higher fatty acid ester, a higher fatty acid amide and polypropylene glycol, to impart a hydrophilic group thereto.

Examples of the higher alcohol as the hydrophobic base component include $C_{10-30}$ saturated alcohols such as lauryl alcohol, tridecyl alcohol, tetradecyl alcohol, cetyl alcohol, octadecyl alcohol and aralkyl alcohol, and $C_{10-26}$ unsaturated alcohols such as oleyl alcohol. Examples of the alkyl phenol include $C_{4-16}$ alkyl phenols such as octyl phenol and nonyl phenol. These higher alcohols may be used alone or in combination of two or more thereof.

Examples of the higher fatty acid as the hydrophobic base component include saturated fatty acids [for example, $C_{10-30}$ saturated fatty acids such as myristic acid, palmitic acid, stearic acid, arachidic acid, behenic acid, lignoceric acid, cerotic acid, and montanoic acid, preferably $C_{12-28}$ saturated fatty acids, more preferably $C_{14-26}$ saturated fatty acids, and particularly preferably $C_{16-22}$ saturated fatty acids; oxycarbonic acids such as hydroxystearic acid; etc.], and unsaturated fatty acids [for example, $C_{16-30}$ unsaturated fatty acids such as oleic acid, erucic acid, linolic acid, linolenic acid, and eleostearic acid, etc.]. These higher fatty acids may be used alone or in combination of two or more thereof.

The polyhydric alcohol higher fatty acid ester is an ester of a polyhydric alcohol and the above higher fatty acid, and contains an unreacted hydroxy group. Examples of the polyhydric alcohol include alkanediols ($C_{2-10}$ alkanediols such as ethylene glycol, propylene glycol and butanediol), alkanetriols (such as glycerin, trimethylolethane, and trimethylolpropane), alkanetetraols (such as pentaerythritol and diglycerine), alkanehexaols (such as dipentaerythritol, sorbitol, sorbit, and triglycerin), alkaneoctaols (such as sucrose), and alkylene oxide adducts thereof (such as $C_{2-4}$ alkylene oxide adducts).

Hereinafter, "oxyethylene", "ethylene oxide" or "ethylene glycol" is represented by "EO", and "oxypropylene", "propylene oxide" or "propylene glycol" is represented by "PO". Specific examples of the polyethylene glycol type nonionic surfactant include: poly EO higher alcohol ethers (poly EO $C_{10-26}$ alkyl ethers such as poly EO lauryl ether and poly EO stearyl ether); poly EO poly PO higher alcohol ether (e.g., poly EO poly PO $C_{10-26}$ alkyl ether); alkyl phenol-EO adducts such as poly EO octyl phenyl ether and poly EO nonyl phenyl ether; fatty acid-EO adducts such as poly EO monolaurate, poly EO monooleate, and poly EO monostearate; glycerin mono- or di-higher fatty acid ester-EO adducts (EO adducts of glycerin mono- or di-$C_{10-26}$ fatty acid ester such as glycerin mono- or di-laurate, glycerin mono- or di-palmitate, glycerin mono- or di-stearate, and glycerin mono- or di-olate); pentaerythritol higher fatty acid ester-EO adducts (pentaerythritol mono- to tri-$C_{10-26}$ fatty acid ester-EO adducts such as a pentaerythritol distearate-EO adduct); sorbitan fatty acid ester-EO adducts such as a dipentaerythritol higher fatty acid ester-EO adduct, a sorbitol higher fatty acid ester-EO adduct, a sorbitol higher fatty acid ester-EO adduct, poly EO sorbitan monolaurate, poly EO sorbitan monostearate, and poly EO sorbitan tristearate; polyhydric alcohol fatty acid ester-EO adduct such as a sucrose higher fatty acid ester-EO adduct; higher alkylamine-EO adducts such as poly EO laurylamino ether and poly EO stearylamino ether; fatty acid amide-EO adducts such as poly EO coconut fatty acid monoethanolamide, poly EO lauric acid monoethanolamide, poly EO stearic acid monoethanolamide, and poly EO oleic acid monoethanolamide; oil-EO adducts such as poly EO castor oil and poly EO hardened castor oil; and poly PO-EO adducts (such as a poly EO-poly PO block copolymer). These polyethylene glycol type nonionic surfactants may be used alone or in combination of two or more thereof.

The polyhydric alcohol type nonionic surfactant is a nonionic surfactant in which a hydrophobic group of higher fatty acid or the like is combined with the above polyhydric alcohol (particularly alkanetriols to alkanehexaols such as glycerol, diglycerin, pentaerythritol, sucrose and sorbitol). Examples of the polyhydric alcohol type nonionic surfactant include glycerin fatty acid esters such as glycerin monostearate and glycerin monooleate, polyglycerin fatty acid esters such as diglycerin monostearate, pentaerythritol fatty acid esters such as pentaerythritol monostearate and pentaerythritol di-tallow acid ester, sorbitan fatty acid esters such as sorbitan monolaurate and sorbitan monostearate, sorbitol fatty acid ethers such as sorbitol monostearate, sucrose fatty acid esters, alkyl ethers of polyhydric alcohols, fatty acid amides of alkanolamines such as coconut oil fatty acid diethanolamide, and alkyl polyglycosides. These polyhydric alcohol type nonionic surfactants may be used alone or in combination of two or more thereof, or may be used in combination with the above polyethylene glycol type nonionic surfactant.

The ionic surfactant may be an anionic surfactant such as sulfonates (alkylbenzene sulfonate, α-olefin sulfonate, alkane sulfonate, etc.), sulfates (alkyl sulfates, poly EO alkyl ether sulfates, etc.), long chain fatty acid salts, naphthalene sulfonic acid formalin condensates, phosphate esters (aliphatic phosphate type, aromatic phosphate type, alkyl phosphate, etc.), and sulfosuccinate ester salts, a cationic surfactants such as alkyltrimethylammonium salts, dialkyldimethylammonium salts, or an amphoteric surfactant such as alkyl betaine and imidazoline derivatives.

Preferred surfactants are nonionic surfactants, particularly polyethylene glycol type nonionic surfactants. Therefore, the hydrophilic plasticizer (or surfactant) may contain at least a nonionic surfactant (particularly, a polyethylene glycol type nonionic surfactant).

The hydrophile-lipophile-balance (HLB) value of the surfactant is not particularly limited, and may be about 5 to 15, preferably about 7 to 15 (for example, 8 to 14), and more preferably about 10 to 14 (for example, 11 to 13). By adjusting the HLB value, the degree of bleeding out from the compression rubber layer can be adjusted.

Further, the surfactant is not particularly limited, and may have a boiling point higher than the vulcanization temperature of the rubber. The melting point of the surfactant is lower than or equal to room temperature, for example, about −40° C. to 20° C. (for example, −35° C. to 10° C.), and preferably about −35° C. to 5° C. (for example, -30° C. to -5° C.), and may be generally 0° C. or lower. The surfactant may generally be liquid at room temperature (20° C. to 25° C.). By adjusting the melting point, the degree of bleeding out from the compression rubber layer may be adjusted.

In the rubber composition forming the inner layer, the blending amount of the hydrophilic plasticizer can be selected from the range of about 0.1 to 20 parts by mass (for example, 1 to 15 parts by mass) with respect to 100 parts by mass of the rubber component, and may be generally about 1.5 to 12 parts by mass (for example, 2 to 10 parts by mass), preferably about 2.5 to 8 parts by mass (for example, 3 to 7 parts by mass), and more preferably, and more preferably about 4 to 6 parts by mass. When the proportion of the hydrophilic plasticizer is too small, the sound emission resistance during water injection cannot be significantly improved, and when the proportion is too large, the durability of the inner peripheral portion (frictional power transmission surface) of the belt may decrease.

JP-A-2015-194239 discloses a power transmission belt in which a fiber member covering the surface of the power friction transmission portion contains a water-absorbent fiber and also contains a surfactant and also discloses that the compression layer of the belt may contain a surfactant (paragraph [0098]). However, this literature does not specifically disclose that the compression layer contains a surfactant and the surface of the compression layer is covered with a knitted fabric, and discloses an example in which the rubber composition contains short fibers and a surfactant as Comparative Example.

Unsaturated Carboxylic Acid Metal Salt and Polyolefin Particles

The rubber composition forming the inner layer may contain at least polyolefin particles, and may contain unsaturated carboxylic acid metal salts and/or polyolefin particles. It has been found that when such a component (particularly both an unsaturated carboxylic acid metal salt and polyolefin particles) is contained in the rubber composition forming the inner layer, the wear resistance of the fabric can be improved and the sound emission resistance can be maintained for a long period of time. The mechanism of such an effect is not clear, and at first glance, since the frictional power transmission surface of the compression rubber layer is covered with a fabric, it seems that there is no relation between the wear of the fabric and the blending formulation of the rubber composition. However, it is presumed that since, in practice, the rubber composition penetrates between the fibers of the fabric (knitted fabric, etc.) and holds the fibers of the fabric to firmly fix or bond the fabric, the fibers of the fabric (knitted fabric, etc.) is prevented from falling off from the surface of the compression rubber layer and the wear resistance is improved. Particularly, in a fabric (knitted fabric, etc.) containing hydrophilic fibers (cellulose-based fiber, etc.) capable of improving water absorbency, the hydrophilic fibers are easily worn. Particularly, cellulose-based fibers are more likely to be worn than many synthetic fibers. However, when an unsaturated carboxylic acid metal salt and/or polyolefin particles are contained in the rubber composition, the wear resistance of the fabric (knitted fabric, etc.) can be improved without considering the structure of the knitted fabric such as a warp knit or the impregnation of the resin into the fabric.

Examples of the unsaturated carboxylic acid of the unsaturated carboxylic acid metal salt include monocarboxylic acids such as (meth)acrylic acid and crotonic acid, dicarboxylic acids such as maleic acid, fumaric acid, and itaconic acid, and monoalkyl esters of these dicarboxylic acids. These unsaturated carboxylic acids can be used alone or in combination of two or more thereof. A preferred unsaturated carboxylic acid is (meth)acrylic acid. Examples of the metal of the unsaturated carboxylic acid metal salt include polyvalent metals, for example, Group 2 elements in the periodic table (magnesium, calcium, etc.), Group 4 elements in the periodic table (titanium, zirconium, etc.), and Groups 8 to 14 elements in the periodic table (iron, cobalt, nickel, copper, zinc, aluminum, tin, lead, etc.). These metals can be used alone or in combination of two or more thereof. Preferred metals are Group 2 elements in the periodic table (magnesium, etc.), Group 12 elements of the periodic table (zinc, etc.) and the like.

Examples of the preferred unsaturated carboxylic acid metal salt include polyvalent metal salts of (meth)acrylic acid, such as zinc (meth)acrylate and magnesium (meth)acrylate. These unsaturated carboxylic acid metal salts can be used alone or in combination of two or more thereof.

Examples of an olefin-based resin forming the polyolefin particles include a homopolymer or copolymer containing ethylene and/or polypropylene as a main monomer, for example, polyethylene-based resins (low density polyethylene, high density polyethylene, linear low density polyethylene, ultra high molecular weight polyethylene, etc.), polypropylene-based resin (isotactic, syndiotactic, atactic polypropylene, etc.), ethylene-propylene copolymers (an ethylene-propylene copolymer containing ethylene as a main monomer and a propylene-ethylene copolymer containing propylene as a main monomer), and monomers copolymerizable with ethylene and/or propylene (at least one monomer selected from $\alpha$-$C_{4-12}$ olefins such as butene, (meth)acrylic monomers such as methyl methacrylate, halogen-containing vinyl monomers such as vinyl chloride, and the like). The polyolefin-based resin may be a metallocene-based polyolefin using a metallocene catalyst. The amount of the copolymerizable monomer used may be about 0 mol % to 20 mol % (for example, 1 mol % to 10 mol %) with respect to the total amount of monomers.

These polyolefin particles can be used alone or in combination of two or more thereof. Preferred polyolefin particles are usually formed of a polyethylene having high wear resistance, for example, a low density polyethylene and an ultra high molecular weight polyethylene.

The shape of the polyolefin particles may be an amorphous shape, a columnar shape, an ellipsoidal shape, a spherical shape, or the like, and is generally spherical in many cases. The average particle size of the polyolefin particles may be, for example, about 0.1 μm to 300 μm (for example, 1 μm to 250 μm), preferably about 5 μm to 200 μm (for example, 10 μm to 170 μm), and more preferably about 15 pm to 150 μm (for example, 20 to 120 μm), or may be about 50 pm to 250 μm (for example, 70 μm to 220 μm), and preferably about 80 μm to 200 μm (for example, 100 μm to 150 μm). Polyolefin particles having different average particle sizes may be used in combination. The average particle size of the polyolefin particles can be measured using a laser diffraction scattering method.

The proportion of the unsaturated carboxylic acid metal salt can be selected from the range of about 0.5 to 30 parts by mass (for example, 1 to 25 parts by mass) with respect to 100 parts by mass of the rubber component forming the inner layer, and generally may be about 2 to 20 parts by mass (for example, 2.5 to 17 parts by mass), preferably about 3 to 15 parts by mass (for example, 4 to 12 parts by mass), and more preferably about 3 to 7 parts by mass (for example, 4 to 6 parts by mass). When the content of the unsaturated carboxylic acid metal salt is too small, the wear resistance of the fabric cannot be improved so much, and when the content is too large, the durability of the rubber layer containing the unsaturated carboxylic acid metal salt may decrease.

A commercially available product (rubber alloy) containing an unsaturated carboxylic acid metal salt may be used as the rubber component. The mass ratio of the rubber component and the unsaturated carboxylic acid metal salt may be prepared by mixing with a commercially available rubber in consideration of the content of the unsaturated carboxylic acid metal salt of the commercially available product.

The proportion of the polyolefin particles can be selected from the range of about 1 to 40 parts by mass (for example, 2 to 35 parts by mass) with respect to 100 parts by mass of the rubber component forming the inner layer, and generally may be about 5 to 30 parts by mass (for example, 7 to 25 parts by mass), preferably about 7 to 20 parts by mass (for example, 8 to 15 parts by mass), and more preferably about 5 to 15 parts by mass (for example, 7.5 to 12.5 parts by mass). When the content of the polyolefin particles is too small, the wear resistance of the fabric cannot be improved so much, and when the content is too large, the durability of the rubber layer containing the polyolefin particles may decrease.

Short Fibers

The rubber composition forming the inner layer may further include short fibers. Examples of the short fibers include short fibers, i.e., fibers (water-absorbent fibers and/or non-water-absorbent fibers) exemplified by the fabric (knitted fabric, etc.) [for example, cellulose-based short fibers such as cotton and rayon, polyester-based short fibers (PET short fibers, etc.), and polyamide short fibers (aliphatic polyamide short fibers such as polyamide 6, aramid short fibers, etc.)]. These short fibers may be used alone or in combination of two or more thereof. The average fiber length of the short fibers may be, for example, about 0.1 mm to 30 mm (for example, 0.2 mm to 20 mm), preferably about 0.3 mm to 15 mm, and more preferably about 0.5 mm to 5 mm.

The short fibers may be subjected to a surface treatment with a surfactant, a silane coupling agent, an epoxy compound (or epoxy resin), an isocyanate compound (polyisocyanate), a resorcin-formalin-latex liquid (RFL liquid), or the like, if necessary.

The short fibers can be oriented in a predetermined direction in the process of preparing an unvulcanized rubber sheet by, with a roll or a calender, rolling a rubber composition kneaded with a Banbury mixer or the like.

When the short fibers are contained in the inner layer, the bendability is lowered and the torque loss is likely to increase. Therefore, the content of the short fibers is preferably low. The proportion of the short fibers may be a small amount, for example, 10 parts by mass or less (for example, about 0.1 to 10 parts by mass) with respect to 100 parts by mass of the rubber component forming the inner layer. The inner layer does not have to contain short fibers. In a V-ribbed belt having a frictional power transmission surface not covered with a fabric, when the content of the short fibers is small, the durability and the sound emission resistance of the belt may decrease. However, in the present invention, since the frictional power transmission surface is covered with a fabric (knitted fabric, etc.), the durability and the sound emission resistance are excellent even when the content of the short fibers is small or short fibers are not contained.

Vulcanizer and Crosslinking Agent

The rubber composition forming the inner layer usually further contains a vulcanizer and/or a crosslinking agent. Examples of the vulcanizer include sulfur, oximes (quinone dioximes, etc.), and guanidines (diphenylguanidine, etc.). Examples of the crosslinking agent include an organic peroxide. Examples of the organic peroxide include commonly used components, for example, diacyl peroxides (dilauroyl peroxide, dibenzoyl peroxide, etc.), peroxy ketals (1,1-di(t-butylperoxy) cyclohexane, 2,2-di(t-butylperoxy) butane, etc.), alkyl peroxy esters (t-butyl peroxybenzoate, etc.), dialkyl peroxides (di-t-butyl peroxide, dicumyl peroxide, t-butyl cumyl peroxide, 2,5-dimethyl-2,5-di(t-butylperoxy)hexane, 2,5-dimethyl-2,5-di(t-butylperoxy)hexyne-3,1, 1-di(t-butylperoxy)-3,3,5-trimethylcyclohexane, 1,3-bis(2-t-butylperoxyisopropyl) benzene, 2,5-di-methyl-2,5-di (benzoyl peroxide) hexane, etc.), and peroxycarbonates (t-butylperoxyisopropyl carbonate, t-butylperoxy-2-ethylhexyl carbonate, t-amylperoxy-2-ethyl-hexyl carbonate, etc.). These vulcanizers or crosslinking agents can be used alone or in combination of two or more thereof.

From the viewpoint of being capable of improving the durability, the total proportion of the vulcanizer and the crosslinking agent can be selected from, for example, the range of about 0.2 to 10 parts by mass (for example, 0.5 to 7 parts by mass) with respect to 100 parts by mass of the rubber component (ethylene-α-olefin elastomer, etc.) forming the inner layer, and generally may be about 1 to 5 parts by mass (for example, 1.5 to 4 parts by mass), and preferably about 1.5 to 3 parts by mass (for example, 1.5 to 2.5 parts by mass). When the proportion of the vulcanizer and the crosslinking agent is too large, the rubber hardness may increase excessively and the durability may decrease, and when the proportion is too small, crosslinking may not proceed sufficiently, and the strength and modulus of the rubber may be insufficient, making power transmission under high load difficult.

Other Components

The rubber composition forming the inner layer may further include additives used commonly, if necessary.

Examples of the additives used commonly include: co-crosslinking agents (alkane polyol poly(meth)acrylates such as ethylene glycol dimethacrylate, butanediol dimethacrylate, trimethylolpropane trimethacrylate, and pentaerythritol tetramethacrylate), triallyl (iso)cyanurates, and bismaleimides such as N,N'-m-phenylene bismaleimide and N,N'-(4, 4'-diphenylmethane bismaleimide); vulcanization aids; vulcanization accelerators (thiuram-based accelerators, etc.); vulcanization promoters (stearic acid, etc.); vulcanization retarders; metal oxides (zinc oxide, magnesium oxide, calcium oxide, barium oxide, iron oxide, copper oxide, titanium oxide, aluminum oxide, etc.); fillers (clay, calcium carbonate, talc, mica, etc.); non-hydrophilic plasticizer or softener (oils such as paraffin oil and naphthenic oil); processing agents or processing aids (metal stearate, wax, paraffin, etc.); anti-aging agents (aromatic amine-based anti-aging agents, benzimidazole-based anti-aging agents, etc.); adhesiveness improvers [resolcin-formaldehyde cocondensates, melamine resins such as hexamethoxymethylmelamine, cocondensates of these (resorcin-melamine-formaldehyde cocondensates, etc.), etc.]; colorants; tackifiers; coupling agents (silane coupling agents, etc.); stabilizers (antioxidants, UV absorbers, heat stabilizers, etc.); lubricants; flame retardants; and antistatic agents. These additives may be used alone or in combination.

The additives can be selected according to the type of additive, and the total proportion of the additives may be, for example, about 0.1 to 30 parts by mass (for example, 0.5 to 20 parts by mass), and preferably about 1 to 15 parts by mass (for example, 1.5 to 10 parts by mass) with respect to 100 parts by mass of the rubber component (ethylene-α-olefin elastomer, etc.) forming the inner layer.

Properties of Inner Layer

The inner layer is formed of a rubber composition having a Mooney Scorch minimum viscosity Vm adjusted to the range of 50 to 110 (an unvulcanized rubber composition having a Vm of 50 to 110 when measured at a temperature of 125° C.). The Vm may be preferably about 60 to 100, and more preferably about 70 to 90 (particularly 75 to 85). When the inner layer is formed of such a rubber composition, the rubber can be prevented from bleeding out to the frictional power transmission surface penetrating the structure of the fabric, and the sound emission resistance can be improved. When the Vm of the rubber composition is too high, the fluidity of the rubber composition may decrease, the penetration to the fabric may decrease, the wear resistance may decrease, and the moldability of the inner layer may decrease. When the Vm is too low, the fluidity of the rubber composition is too high, so that the rubber composition permeates the structure of the fabric (knitted fabric, etc.) and easily bleeds to the frictional power transmission surface, and the bleeding-out to the frictional power transmission surface cannot be sufficiently prevented, which may reduce the sound emission resistance.

When the Vm of the rubber composition is too high, the adhesiveness to the fabric on the frictional power transmission surface may decrease. However, even when a high Vm rubber composition is used, high adhesiveness between the adhesion rubber layer and the fabric can be ensured by a method of preliminarily pressurizing in the vulcanization step and then heating to perform vulcanization molding, a method of raising the vulcanization molding temperature, or a method of treating the fabric.

The thickness (average thickness) of the inner layer can be selected from the range of about 0.03 mm to 0.5 mm (for example, 0.1 mm to 0.5 mm), and may be, for example, about 0.05 mm to 0.3 mm, preferably about 0.1 mm to 0.25 mm, and more preferably about 0.12 mm to 0.2 mm (particularly 0.13 mm to 0.18 mm). The thickness of the inner layer (average thickness) can be selected from the range of about 1% to 50% with respect to the average thickness (average thickness to the top of the rib portion) of the entire compression rubber layer, and may be for example, about 2% to 40% (for example, 5% to 20%), preferably about 3% to 30% (for example, 4% to 20%), and more preferably about 5% to 15% (particularly 6% to 10%). When the thickness of the inner layer is too small, the sound emission resistance during water injection and wear resistance may not be improved so much. On the contrary, when the thickness of the inner layer is too large, crack resistance may be lowered.

Outer Layer of Compression Rubber Layer

In addition to the inner layer, the compression rubber layer has an outer layer (outer rubber layer) on the outer peripheral side of the inner layer. The outer layer may be formed of a plurality of layers, but is preferably a single layer (one layer) from the viewpoint of productivity and the like.

The rubber component of the unvulcanized rubber composition forming the outer layer is similar to the rubber component of the inner layer, including preferred examples and proportions, except for the Mooney viscosity of the unvulcanized rubber. From the viewpoint of being capable of improving the moldability and the durability of the belt, the Mooney viscosity (ML(1+4) 125° C.) of the unvulcanized rubber (ethylene-α-olefin elastomer, etc.) in the outer layer may be, for example, about 20 to 80 (for example, 35 to 75), and is generally about 40 to 75 (for example, 45 to 73), and preferably about 50 to 70 (for example, 55 to 65).

The rubber composition forming the outer layer may further contain a reinforcing agent (reinforcing filler). The reinforcing agent is similar to the reinforcing agent for the inner layer, including preferred examples. The viscosity of the rubber composition may be adjusted by the viscosity of the rubber component, and may also be adjusted by the proportion of the reinforcing agent (particularly carbon black). In this case, the proportion of carbon black may be higher than that in the inner layer, and may be about 30 parts by mass or more, preferably 40 to 200 parts by mass, more preferably 50 to 150 parts by mass, and more preferably about 60 to 100 parts by mass, with respect to 100 parts by mass of the rubber component (particularly ethylene-α-olefin elastomer) forming the outer layer.

The rubber composition forming the outer layer may further contain a hydrophilic plasticizer. The hydrophilic plasticizer is similar to the hydrophilic plasticizer of the inner layer, including preferred examples and proportions.

The rubber composition forming the outer layer may further contain an unsaturated carboxylic acid metal salt. The unsaturated carboxylic acid metal salt is similar to the unsaturated carboxylic acid metal salt of the inner layer, including preferred examples and proportions.

The rubber composition forming the outer layer may further contain polyolefin particles. The polyolefin particles are similar to the polyolefin particles of the inner layer, including preferred examples and proportions.

The rubber composition forming the outer layer may further contain short fibers, a vulcanizer, a crosslinking agent, and other components. The components are similar to the short fibers, the vulcanizer, the crosslinking agent, and other components of the inner layer, including preferred examples and proportions.

The outer layer is formed of a rubber composition having a Mooney Scorch minimum viscosity Vm adjusted to the range of 70 to 130. The Vm may be preferably about 80 to 120, and more preferably about 90 to 110 (particularly 95 to 105). When the Vm of the rubber composition forming the outer layer is too low, the belt strength may decrease. On the contrary, when the Vm is too high, the rib shape may be defective.

The Mooney Scorch minimum viscosity Vm of the rubber composition forming the outer layer may be within the above range. From the viewpoint of improving the durability of the belt, the Vm of the rubber composition forming the inner layer is preferably lower than the Vm of the rubber composition forming the outer layer. Specifically, the Vm of the rubber composition forming the inner layer may be, for example, 5 to 40, preferably 10 to 30, and more preferably 15 to 25 lower than the Vm of the rubber composition forming the outer layer. Thus, when an unvulcanized compression rubber layer (unvulcanized rubber sheet) in which Vm is distributed in the thickness direction is used, the Vm of the outer layer can be increased to increase the strength of the belt, while the Vm of the inner layer can be decreased (to the extent that the rubber does not completely penetrate the fabric). Therefore, the rubber composition can easily penetrate into the structure of the fabric without lowering the durability of the belt, and the adhesive force between the fabric and the compression rubber layer and the wear resistance of the fabric can be improved.

Properties of Compression Rubber Layer

The thickness of the compression rubber layer (average thickness to the top of the rib portion) may be, for example, about 1 mm to 10 mm (for example, 1.5 mm to 8 mm), and preferably about 2 mm to 6 mm (for example, 2.5 mm to 6 mm), may be about 1.5 mm to 5 mm (for example, 2 mm to 4 mm), or may be about 2 mm to 5 mm.

In the V-ribbed belt, the pitch of the rib portion may be selected from the range of, for example, about 1 mm to 10 mm (for example, 1.2 mm to 8 mm), or may be about 1.5 mm to 5 mm (for example, 1.6 mm to 4 mm).

Cord (or Tension Member)

Examples of fibers forming the cord (or tension member) include fibers having a high elastic modulus, for example, high strength polyethylene fiber, PBO fibers, polyarylate fibers, polyester fibers such as PET fibers and PEN fibers, polyamide fibers such as aramid fibers, and carbon fibers. These fibers can be used alone or in combination of two or more thereof.

Patent Literature 2 discloses that in order to use fibers having a high elastic modulus, it is necessary to set the expansion rate of the flexible jacket in the molding step to be low, so that the cord of polyester fibers having a low elastic modulus such as PET fibers is used. Although the V-ribbed belt can be used for a wide range of purposes even with such a cord, in recent years, it is required to increase the power transmission capacity due to space saving and an increase in auxiliary machine in the automobile industry and the like. Therefore, it is important to use a cord made of fibers having a high tensile elastic modulus. However, when such a cord is used, even when the expansion force of the flexible jacket is utilized in the molding and vulcanization steps, a laminate containing the unvulcanized rubber layer cannot be sufficiently pressed against the outer mold having the rib mold, and the accuracy of the rib portion of the belt is lowered. On the other hand, when the pressure of the laminate (laminate containing the unvulcanized rubber layer) with respect to the molding mold (for example, the expansion pressure for pressing the molded body toward the outer mold) is increased, the rubber composition easily penetrates the structure of the fabric and bleeds out to the frictional power transmission surface. Therefore, even when the laminate is pressurized against the outer mold at a high pressure, it is necessary to take measures to prevent the rubber composition from bleeding out to the frictional power transmission surface.

In the present invention, even when the laminate is pressurized with a high pressure in the molding step, and even when the belt has a cord formed of fibers having a high tensile elastic modulus embedded therein, it is possible to effectively prevent the rubber composition from bleeding out to the frictional power transmission surface. Therefore, the present invention can be suitably applied not only to a V-ribbed belt containing a cord formed of fibers having a low tensile elastic modulus, but also to a V-ribbed belt containing a cord formed of fibers having a high tensile elastic modulus.

The tensile elastic modulus of the fibers forming the cord may be, for example, about 1 GPa to 500 GPa (for example, 5 GPa to 400 GPa), and preferably about 10 GPa to 300 GPa (for example, 25 GPa to 250 GPa). In the present invention, the tensile elastic modulus may be about 50 GPa or more (for example, 60 GPa to 500 GPa, preferably 70 GPa to 400 GPa, and more preferably 100 GPa to 300 GPa.), and the cord can be effectively applied to a V-ribbed belt containing a cord formed of fibers having a high elastic modulus of about 60 GPa to 150 GPa (for example, 65 GPa to 120 GPa). Such fibers having a high elastic modulus include, for example, aramid fibers and carbon fibers.

The average fineness of the fibers (monofilament yarns) may be, for example, about 0.1 dtex to 5 dtex, preferably about 0.3 dtex to 3 dtex, and more preferably about 0.5 dtex to 1 dtex. The fibers can be used in the form of a multifilament yarn as a raw yarn (for example, a multifilament yarn containing about 1,000 to 50,000, and preferably about 5,000 to 20,000 monofilament yarns).

The cord (or tension member) can be generally used in the form of a twisted cord using multifilament yarns (e.g., plied twist, single twist, and Lang twist) in order to enhance the tensile strength. The cord is often used, for example, as a twisted cord (twisted yarn) in which these multifilament yarns are used as cord yarns (non-twisted yarns, preferably primary twisted yarns) and twisted secondarily in a predetermined direction (for example, in the direction same as or opposite to the primary twisted yarn). The average diameter (average wire diameter) of the cord yarn may be, for example, about 0.2 mm to 1 mm, preferably 0.3 mm to 0.8 mm, and more preferably 0.4 mm to 0.7 mm. The average diameter (average wire diameter) of the cord may be, for example, about 0.3 mm to 1.5 mm, preferably about 0.5 mm to 1.3 mm, and more preferably about 0.7 mm to 1.2 mm.

In order to improve the adhesiveness with the rubber component, the cord is subjected to an adhesion treatment with an epoxy compound, an isocyanate compound, an RFL treatment liquid, a silane coupling agent or the like, similar to the fabric on the frictional power transmission surface and the short fibers.

The cord may be generally embedded in the longitudinal direction of the belt body, and may be embedded in parallel at a predetermined pitch in the longitudinal direction of the belt body. The cord pitch may be larger than the cord diameter according to the cord diameter, and may be, for example, about 0.5 mm to 2 mm, preferably about 0.7 mm to 1.7 mm, and more preferably about 0.8 mm to 1.5 mm.

Tension Layer

The tension layer may be formed of a rubber composition same as that of the compression rubber layer, or may be formed of a fabric (reinforcing fabric) such as a canvas. Examples of the fabric (reinforcing fabric) include fabric materials such as a woven fabric, a wide-angle fabric, a knitted fabric, and a non-woven fabric. Among these, woven fabrics woven in the form of plain weave, twill weave, satin weave, or the like, wide-angle fabrics or knitted fabrics in which an intersection angle between warp yarns and weft yarns is about 90° to 120°, or the like are preferred. As fibers constituting the reinforcing fabric, the fibers (water-absorbent fibers, non-water-absorbent fibers, and the like) exemplified in the section of the fabric (knitted fabric, etc.) of the compression rubber layer can be used.

As the rubber (rubber composition) forming the tension layer, a rubber composition similar to the rubber composition forming the compression rubber layer may be used. In such a rubber composition, the content of the reinforcing agent or the reinforcing filler (carbon black etc.) may be about 30 to 150 parts by mass (for example, 40 to 120 parts by mass), and preferably about 50 to 100 parts by mass (for example, 70 to 90 parts by mass) with respect to 100 parts by mass of the rubber component. The tension rubber layer may contain the short fibers in order to prevent abnormal noise generated by the adhesion of the back rubber in a back drive. The proportion of the short fibers may be, for example, about 5 to 30 parts by mass (preferably 10 to 25 parts by mass, and more preferably 15 to 25 parts by mass) with respect to 100 parts by mass of the rubber component. The short fibers may be randomly arranged in the rubber composition.

In addition, the fabric (reinforcing fabric) forming the tension layer may be subjected to an adhesion treatment similar to that of the fabric on the frictional power transmission surface or the short fibers. Further, instead of the adhesion treatment commonly used, or after the adhesion treatment, a friction treatment in which a reinforcing fabric and a rubber composition are passed through a calender roll to imprint the rubber composition on the reinforcing fabric, a spreading treatment in which a rubber paste is coated onto a reinforcing fabric, a coating treatment in which a rubber composition is laminated on a reinforcing fabric, or the like may be performed.

Further, in order to prevent abnormal noise in a back drive, an uneven pattern (knitted fabric pattern, woven fabric pattern, sudare woven fabric pattern, embossed pattern, etc.) may be provided on the surface of the tension layer (the back surface of the belt).

The thickness of the tension layer may be, for example, about 0.5 mm to 10 mm, preferably about 0.7 mm to 8 mm, and more preferably about 1 mm to 5 mm.

Adhesion Rubber Layer

It is not always necessary to interpose an adhesion rubber layer between the compression rubber layer and the tension layer. The adhesion rubber layer may be formed of, for example, a rubber composition similar to that of the compression rubber layer (for example, a rubber composition containing an ethylene-α-olefin elastomer). The rubber composition forming the adhesion rubber layer may further contain an adhesiveness improver (a resorcin-formaldehyde cocondensate, an amino resin, or the like).

The thickness of the adhesion rubber layer may be, for example, about 0.2 mm to 5 mm, preferably about 0.3 mm to 3 mm, and more preferably about 0.5 mm to 2 mm.

In the rubber compositions forming the tension rubber layer and the adhesion rubber layer, the rubber of the same system or the same type as the rubber component of the rubber composition of the compression rubber layer is often used as the rubber component. The proportion of additives such as a vulcanizer, a crosslinking agent, a co-crosslinking agent, a crosslinking aid, and a vulcanization accelerator may be selected from the same range as that of the rubber composition of the compression rubber layer.

Method for Producing V-ribbed Belt

The V-ribbed belt of the present invention can be produced by a commonly used method. For example, the V-ribbed belt can be produced by pressurizing and vulcanizing a cylindrical unvulcanized laminate containing at least a fabric (knitted fabric, etc.) and an unvulcanized compression rubber layer formed of a plurality of rubber compositions so that the fabric is toward a molding mold, to form a sleeve (cylindrical vulcanized molded body), and cutting the unvulcanized sleeve to a predetermined width. In a preferred example, a cylindrical unvulcanized laminate in which a tension layer (or an unvulcanized tension rubber layer), a cord (tension member), an unvulcanized compression rubber layer formed of a plurality of rubber compositions, and a fabric (knitted fabric, etc.) are sequentially laminated in a cylindrical shape is used. In addition, as described above, the cylindrical unvulcanized laminate may be a laminate in which an unvulcanized adhesion rubber layer is interposed between the unvulcanized compression rubber layer and the tension layer (or an unvulcanized tension rubber layer), if necessary. In such a laminate, the cord (tension member) may be embedded in a predetermined portion, for example, in the unvulcanized adhesion rubber layer. More specifically, the V-ribbed belt can be produced, for example, by the following method.

First Production Method

The V-ribbed belt can be produced by using a forming device including a hollow cylindrical outer mold, a cylindrical inner mold that can be disposed concentrically with this outer mold, and a pressing unit that can move or press the cylindrical unvulcanized laminate disposed between the outer mold and the inner mold toward the outer mold. That is, the V-ribbed belt can be produced by: laminating and disposing a cylindrical unvulcanized laminate on a cylindrical inner mold concentrically disposed in a hollow cylindrical outer mold so that the fabric is directed toward the outer mold; pressurizing and vulcanizing the cylindrical unvulcanized laminate toward the outer mold; and demolding the vulcanized cylindrical molded body and processing the cylindrical molded body into a predetermined form. The cylindrical unvulcanized laminate may be a hollow cylindrical or sleeve-shaped laminate including: an unvulcanized rubber laminated sheet for forming a belt body, which includes at least an unvulcanized rubber sheet for compression rubber layer and an unvulcanized rubber sheet for tension rubber layer laminated or disposed on one surface of the unvulcanized rubber sheet for compression rubber layer; a cord embedded in the longitudinal direction of the rubber laminated sheet; and a knitted fabric laminated or disposed on the other surface of the unvulcanized rubber sheet for compression rubber layer. Such a laminate may be disposed so that the knitted fabric is directed toward the rib mold of the outer mold, and the unvulcanized rubber sheet may be pressurized and vulcanized.

More specifically, a flexible jacket that is expandable and contractile is mounted to the outer peripheral surface of the cylindrical inner mold, an unvulcanized sheet for tension layer is wound around the flexible jacket, a cord (twisted cord) is spirally spun on the sheet, and an unvulcanized sheet for compression rubber layer and a fabric (knitted fabric, etc.) are wound around the sheet, so as to prepare a cylindrical laminate. A hollow cylindrical outer mold with a plurality of rib molds engraved on an inner peripheral surface thereof is used as an outer mold which can be mounted to the inner mold, and the inner mold around which the above-described laminate is wound is disposed concentrically within the outer mold. Then, the flexible jacket is expanded toward the inner peripheral surface (rib molds) of the outer mold, and the laminate (compression rubber layer) is pressed into the rib molds and vulcanized. Then, the inner mold is removed from the outer mold, and a vulcanized molded body sleeve including a plurality of rib portions is demolded from the outer mold, whereby a sleeve-shaped V-ribbed belt can be produced. If necessary, a V-ribbed belt may be produced by cutting a sleeve-shaped V-ribbed belt with a predetermined width in the longitudinal direction of the belt using a cutter.

Second Production Method

In relation to a second production method, for example, a method disclosed in JP-A-2004-82702 may be used in which only a fabric and a compression rubber layer are expanded to prepare a preliminary molded body (semi-vulcanized state), and next a tension layer and a cord are expanded to be pressed and attached onto the preliminary molded body so as to be vulcanized and integrated, thereby obtaining a V-ribbed belt.

In such methods (particularly the first production method), the pressure of the unvulcanized rubber sheet (or the cylindrical unvulcanized laminate) with respect to the outer mold is not particularly limited. When a cord of fibers having a high tensile elastic modulus is used, the unvulcanized rubber sheet may be pressurized to a pressure (for example, the expansion pressure of the flexible jacket) of 1.2 MPa or more (for example, about 1.3 MPa to 2 MPa, and preferably about 1.3 MPa to 1.7 MPa.). By pressurization with such a pressure, the shape of the rib portion can be accurately formed even when the cord of fibers having a high tensile elastic modulus is used. Further, when a rubber composition having a Mooney Scorch minimum viscosity Vm of 50 to 110 at least on the inner peripheral surface side of the belt is used, it is possible to prevent the bleeding-out of the rubber composition to the frictional power transmission surface, and the sound emission resistance does not decrease even when a pressure is applied at a high pressure by utilizing the expansion force of the flexible jacket.

In the unvulcanized rubber sheet for compression rubber layer formed of a plurality of unvulcanized rubber layers, the unvulcanized rubber layer forming the inner rubber layer may be thin. For such an unvulcanized rubber sheet containing an unvulcanized rubber layer, for example, an unvulcanized rubber sheet may be rolled with a calender roll to form at least the unvulcanized rubber layer for inner rubber layer (the unvulcanized rubber layer or rubber sheet for inner rubber layer), and an unvulcanized rubber sheet for outer rubber layer is laminated with the unvulcanized rubber layer for inner rubber layer on a calender roll, so as to prepare an unvulcanized rubber sheet for compression rubber layer. Since the unvulcanized rubber layer forming the inner rubber layer alone is thin, the handleability thereof is poor and wrinkles and the like are likely to occur on the sheet. However, when such a method is used, a thin unvulcanized rubber sheet rolled on the calender roll can be laminated and integrated with the unvulcanized rubber sheet forming the outer peripheral surface on the calender roll, so that the unvulcanized rubber layer forming the inner rubber layer can be uniformly laminated, and the handleability and the productivity can be greatly improved.

EXAMPLES

Hereinafter, the present invention is described in more detail based on Examples, but the present invention is not limited to these Examples. Unless otherwise specifically noted, "part" and "%" are expressed on a mass basis. The raw materials, measuring methods and evaluation methods for respective physical properties used in Examples are shown below.

Material in Use

Rubber Composition

EPDM1: "EPT4045M" manufactured by Mitsui Chemicals, Inc., Mooney viscosity (125° C.): about 33
EPDM2: "EPT3070" manufactured by Mitsui Chemicals, Inc., Mooney viscosity (125° C.): about 47
EPDM3: "EPT3092M" manufactured by Mitsui Chemicals, Inc., Mooney viscosity (125° C.): about 61
Carbon black HAF: "SEAST 3" manufactured by Tokai Carbon Co., Ltd., average particle size: 28 nm, iodine adsorption amount: 80 mg/g
Zinc oxide: "zinc oxide second grade" manufactured by SAKAI CHEMICAL INDUSTRY CO., LTD.
Hydrophilic plasticizer 1: "EMULGEN LS-106" manufactured by Kao Corporation, polyoxyalkylene alkyl ether, HLB =12.5, melting point: −10° C.
Hydrophilic plasticizer 2: "LEOX CL-70" manufactured by Lion Corporation, polyoxyethylene alkyl ether, HLB=12.3, liquid at 20° C.
Unsaturated carboxylic acid metal salt 1: "San Ester SK-30" manufactured by Sanshin Chemical Industry Co., Ltd., zinc methacrylate
Unsaturated carboxylic acid metal salt 2: "San Ester SK-13" manufactured by Sanshin Chemical Industry Co., Ltd., magnesium methacrylate
Polyolefin particles 1: "GUR4150" manufactured by Ticona, ultra high molecular weight polyethylene, average particle size: 120 μm
Polyolefin particles 2: "SK-PE-20L" manufactured by SEISHIN ENTERPRISE Co., Ltd., low density polyethylene, average particle size: 20 μm
Anti-aging agent: "Nonflex OD-3" manufactured by Seiko Chemical Co., Ltd., octyldiphenylamine
Organic peroxide: "Percumyl D" manufactured by NOF Corporation, dicumyl peroxide Cord Cord: treated cord obtained by plied-twisting a bundle of aramid fibers (elastic modulus: 70 GPa) with 1100 dtex into a twist configuration of 2×3 at a primary twisting coefficient of 3.0 and an secondary twisting coefficient of 3.0, and subjecting the obtained twisted cord having a total fineness of 6,600 to an adhesion treatment Knitted Fabric (Fabric)

Knitted fabric base material: knitted fabric with a weft knitting structure (moss stitch, 2 layers), obtained by knitting a cotton spun yarn (count: 40, 1 yarn) as a water-absorbent fiber and a PTT/PET conjugate yarn as a second fiber (fineness: 84 dtex)

Knitted fabric A: treated knitted fabric obtained by immersing the above knitted fabric base material in the following isocyanate treatment liquid and then performing drying Knitted fabric B: treated knitted fabric obtained by immersing the knitted fabric A in the following hydrophilic treatment liquid and then performing drying Knitted fabric C: treated knitted fabric obtained by immersing the above knitted fabric base material in the following RFL treatment liquid and then performing drying

[Isocyanate treatment liquid]: aqueous solution of a heat-reactive isocyanate ("ELASTRON BN-27" manufactured by DKS Co. Ltd., aqueous isocyanate-based crosslinking agent having a dissociation temperature of 180° C. and a solid content concentration of 30 mass %) diluted with water to a solid content concentration of 5 mass %

[Hydrophilic treatment liquid]: aqueous solution of a surfactant ("EMULGEN LS-106" manufactured by Kao Corporation) diluted with water to a concentration of 20 mass %

[RFL treatment liquid]: solution containing 2.6 parts by mass of resorcin, 1.4 parts by mass of 37% formalin, 17.2 parts by mass of vinyl pyridine-styrene-butadiene copolymer latex, and 78.8 parts by mass of water Rubber Composition As the unvulcanized rubber composition for the compression rubber layer, the rubber compositions shown in Table 1 below were used. Further, as the unvulcanized rubber composition for the tension rubber layer, the rubber compositions shown in Table 2 below were used.

TABLE 2

[Rubber composition for tension rubber layer]

| | |
|---|---|
| EPDM2 | 100 |
| Zinc oxide | 5 |
| Stearic acid | 1 |
| Carbon black HAF | 80 |
| Anti-aging agent | 2 |
| Organic peroxide | 2 |
| Nylon flock (fiber length: about 0.5 mm) | 20 |
| Total | 210 |

Mooney Scorch Minimum Viscosity (Vm)

Figure 2:
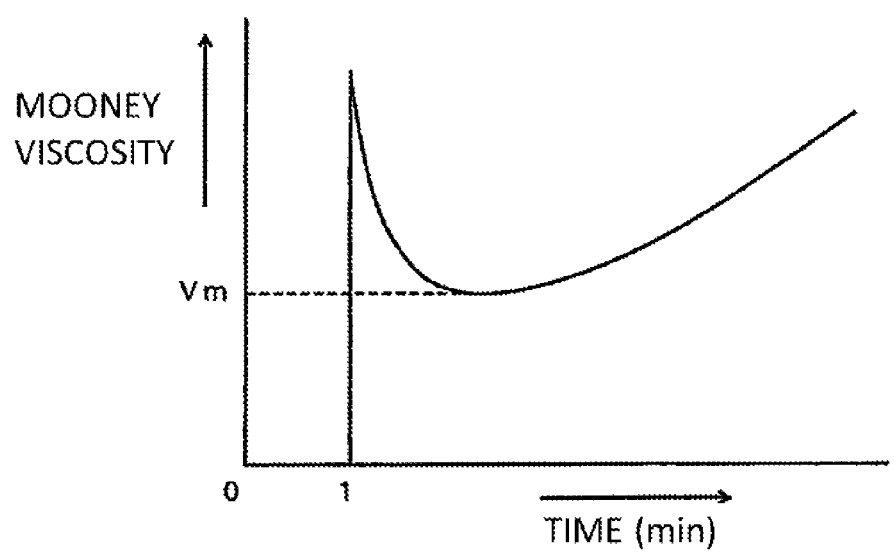
FIG. 2 is a graph showing the behavior of Mooney viscosity for illustrating a method for measuring Mooney Scorch minimum viscosity (Vm).

The Mooney Scorch minimum viscosity was measured according to the Mooney scorch test of JIS K6300-1 (2013). An L-shaped rotor was used and the test temperature was set to 125° C. A polyester film having a thickness of about 0.04 mm ("Lumirror" manufactured by Toray Industries, Inc.) was disposed between surfaces of a test piece (unvulcanized rubber composition) and a die. After closing the die, pre-heating was performed for 1 minute, thereafter the rotor was rotated and the transition of the Mooney viscosity was recorded. The recorded Mooney viscosity generally showed the behavior shown in FIG. 2 below, and the value when the Mooney viscosity is the lowest was adopted as the Mooney Scorch minimum viscosity (Vm).

Contact Angle with Respect to Water

Figure 3:
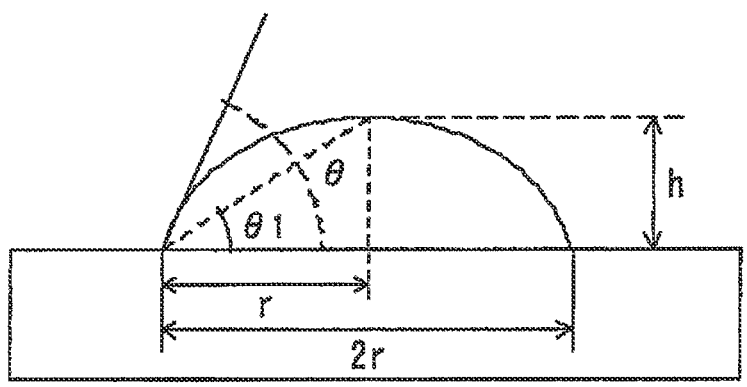
FIG. 3 is a schematic diagram for illustrating a method of measuring a contact angle with respect to water in Examples.

The rubber composition for the compression rubber layer was press-vulcanized at a temperature of 160° C. for a time of 30 minutes to prepare a vulcanized rubber sheet (length 100 mm×width 100 mm×thickness 2 mm). The contact angle θ between the surface of the vulcanized rubber sheet and water (the angle between the tangent of the water droplet and the surface) can be calculated from a projected photograph of the water droplet with water dropped on the surface according using the following equations with the θ/2 method, as shown in FIG. 3.

TABLE 1

[Rubber composition for compression rubber layer]

| | R-1 | R-2 | R-3 | R-4 | R-5 | R-6 | R-7 | R-8 | R-9 |
|---|---|---|---|---|---|---|---|---|---|
| EPDM1 | 100 | — | — | 100 | — | — | — | — | — |
| EPDM2 | — | 100 | — | — | 100 | — | 100 | 100 | 100 |
| EPDM3 | — | — | 100 | — | — | 100 | — | — | — |
| Zinc oxide | 5 | 5 | 5 | 5 | 5 | 5 | 5 | 5 | 5 |
| Stearic acid | 1 | 1 | 1 | 1 | 1 | 1 | 1 | 1 | 1 |
| Carbon black HAF | 50 | 50 | 50 | 40 | 50 | 70 | 50 | 50 | 50 |
| Hydrophilic plasticizer 1 | 5 | 5 | 5 | 5 | — | 5 | — | 5 | 5 |
| Hydrophilic plasticizer 2 | — | — | — | — | — | — | 5 | — | — |
| Unsaturated carboxylic acid metal salt 1 | 5 | 5 | 5 | 5 | 5 | 10 | — | — | 5 |
| Unsaturated carboxylic acid metal salt 2 | — | — | — | — | — | — | 5 | — | — |
| Polyolefin particles 1 | 10 | 10 | 10 | 10 | 10 | 10 | — | — | 5 |
| Polyolefin particles 2 | — | — | — | — | — | — | 10 | — | — |
| Anti-aging agent | 2 | 2 | 2 | 2 | 2 | 2 | 2 | 2 | 2 |
| Organic peroxide | 2 | 2 | 2 | 2 | 2 | 2 | 2 | 2 | 2 |
| Total | 180 | 180 | 180 | 170 | 175 | 205 | 180 | 165 | 175 |

$$\theta = 2\theta 1 \quad (1)$$

$$\tan\theta 1 = h/r \rightarrow \theta 1 = \tan^{-1}(h/r) \quad (2)$$

(In the equations, θ1 represents the angle of a straight line connecting the end point (left end point in FIG. 3) and the apex of the water droplet with respect to the surface, h represents the height of the water droplet, and r represents the radius of the water droplet.)

By substituting the equation (2) into the equation (1), the following equation (3) is obtained.

$$\theta = 2\tan^{-1}(h/r) \quad (3)$$

For the measurement of the contact angle, r and h were measured from the projected photograph of the dropped water droplets using a fully automatic contact angle meter ("CA-W type" manufactured by Kyowa Interface Science Co., Ltd.), and calculated using the equation (3). The projected photograph used was obtained one second after dropping. The smaller the contact angle θ, the better the affinity of the surface with water.

Hardness

The rubber composition for the compression rubber layer was press-vulcanized at a temperature of 160° C. for a time of 30 minutes to prepare a vulcanized rubber sheet (length 100 mm×width 100 mm×thickness 2 mm). Using a laminate obtained by laminating three vulcanized rubber sheets as a sample, the hardness was measured using a durometer A type hardness testing machine according to JIS K6253 (2012).

DIN Wear Amount

The sheet for compression rubber layer was press-vulcanized at a temperature of 160° C. for a time of 30 minutes to prepare a vulcanized rubber sheet (length 50 mm×width 50 mm×thickness 8 mm). The vulcanized rubber sheet was cut from the thickness direction of the vulcanized rubber sheet with a hollow drill at an inner diameter of 16.2 mm, to prepare a columnar test piece having a diameter of 16.2±0.2 mm and a thickness of 8 mm. The wear amount was measured using a DIN wear testing machine (rotary cylindrical wear testing machine) according to JIS K6264 (2005). A polishing pad was attached to a rotating drum by a polishing pad presser, the test method was method A in which the test piece was measured without rotating, and the additional force of the test piece was set to 10 N. The change in weight of the test piece before and after the test was measured, and the wear amount (wear volume) was calculated from the specific gravity of the test piece measured in advance.

Table 3 shows the properties of the rubber composition and rubber.

TABLE 3

[Evaluation result of rubber composition and rubber]

| | R-1 | R-2 | R-3 | R-4 | R-5 | R-6 | R-7 | R-8 | R-9 |
|---|---|---|---|---|---|---|---|---|---|
| Mooney Scorch minimum viscosity | 60 | 80 | 100 | 40 | 80 | 150 | 80 | 80 | 75 |
| Contact angle (°) with respect to water | 80 | 75 | 80 | 80 | 80 | 80 | 75 | 75 | 80 |
| Hardness (JIS-A) | 80 | 78 | 76 | 78 | 79 | 82 | 78 | 76 | 76 |
| DIN wear amount (mm$^3$) | 48 | 49 | 51 | 58 | 51 | 45 | 49 | 57 | 52 |

The rubber compositions R-1 to R-3 are rubber compositions in which the Mooney Scorch minimum viscosity Vm is adjusted by using EPDMs having different Mooney viscosities. The rubber compositions R-4 and R-6 are rubber compositions in which the blending amount of carbon black is also changed and the Vm is changed in a wider range. The rubber composition R-5 is a rubber composition containing no hydrophilic plasticizer. The rubber composition R-8 is a rubber composition containing no unsaturated carboxylic acid metal salt and no polyolefin particles. The rubber composition R-7 is a rubber composition in which the types of the hydrophilic plasticizer, the unsaturated carboxylic acid metal salt, and the polyolefin particles are changed. The rubber composition R-9 is a rubber composition in which the blending amount of the polyolefin particles is changed.

It is surprising that the rubber composition containing a hydrophilic plasticizer does not have a particularly small contact angle with respect to water as compared with the rubber composition R-5 containing no hydrophilic plasticizer. Although the reason is not clear, from the evaluation results of the belt below, it seems that the effect of the hydrophilic plasticizer is effectively exhibited by the combination with the fabric.

Production of Belt

A flexible jacket was mounted to an outer peripheral surface of a cylindrical inner mold, an unvulcanized sheet for tension rubber layer was wound around the flexible jacket, a cord (twisted cord) to be a tension member was spirally spun on the sheet, and an unvulcanized sheet for compression rubber layer and a knitted fabric were wound around the sheet, so as to prepare a laminate. The inner mold around which the cylindrical laminate was wound was disposed concentrically within a cylindrical outer mold having a plurality of rib molds engraved on an inner peripheral surface thereof, the flexible jacket was expanded to press the laminate into the rib molds under a pressure of 1.5 MPa, and vulcanization was performed at 160° C. for 30 minutes. Then, the inner mold was removed from the outer mold, the vulcanized rubber sleeve including a plurality of ribs was demolded from the outer mold, and the vulcanized rubber sleeve was cut into a predetermined width in the belt longitudinal direction using a cutter, thereby producing a 6PK980 V-ribbed belt (the number of ribs: 6, circumferential length: 980 mm, belt shape: K shape, belt thickness: 4.3 mm, rib height: about 2 mm, rib pitch: 3.56 mm).

The unvulcanized sheet for compression rubber layer was prepared by kneading the rubber composition for compression rubber layer and laminating an unvulcanized sheet for inner rubber layer having a predetermined thickness and an unvulcanized sheet for outer rubber layer having a predetermined thickness with a calender roll. When the compression rubber layer was not formed into a two-layer structure having different formulations, an unvulcanized rubber sheet having a uniform composition and a thickness of 2.0 mm was used as the sheet for compression rubber layer. On the other hand, when the compression rubber layer was formed into a two-layer structure with different formulations, as the sheet for compression rubber layer, a laminated sheet in which an unvulcanized rubber sheet for outer rubber layer and an unvulcanized rubber sheet for inner rubber layer were laminated (doubling) in advance was used. The thickness of the unvulcanized rubber sheet for outer rubber layer was 1.7 mm, the thickness of the unvulcanized rubber sheet for inner rubber layer was 0.3 mm, and the thickness of the sheet for compression rubber layer obtained by doubling the unvulcanized rubber sheet for outer rubber layer and the unvulcanized rubber sheet for inner rubber layer was 2.0 mm. In the V-ribbed belt (after vulcanization) using different formulations for the outer rubber layer and the inner rubber layer, the average thickness of the inner rubber layer was reduced to 0.15 mm. The unvulcanized sheet for tension rubber layer was formed by kneading the rubber composition for tension rubber layer and forming the kneaded body into a predetermined thickness with a calender roll.

Figure 4:
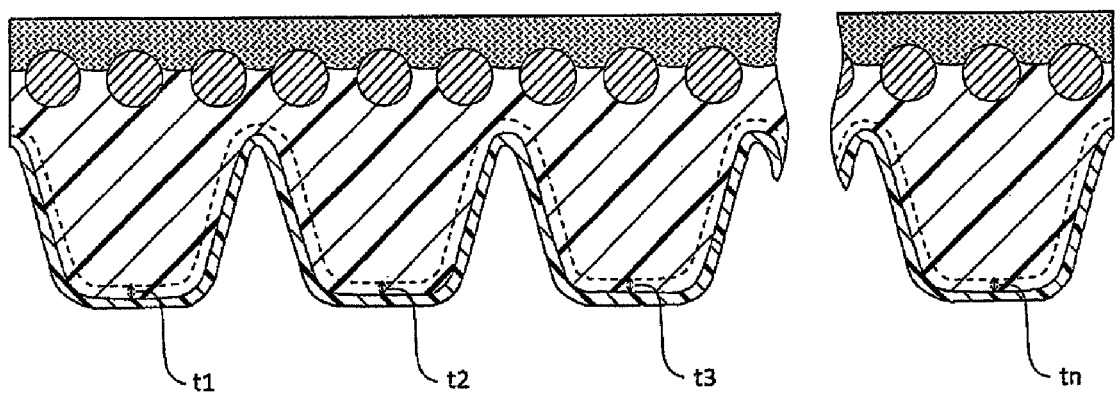
FIG. 4 is a schematic cross-sectional view for illustrating a method of measuring an average thickness of an inner rubber layer in Examples.

The V-ribbed belt was cut in parallel with the belt width direction, and the cut surface was magnified 20 times with a microscope and observed. The thickness of the inner rubber layer at the center of the rib tip in the belt width direction was measured. As shown in FIG. 4 and the following equation, the arithmetic mean of the thicknesses ($t1$ to $tn$) of the inner rubber layer measured in all the ribs was obtained and used as the average thickness of the inner rubber layer.

$$\text{Average thickness of inner rubber layer} = (t1 + t2 + t3 + \ldots + tn)/n$$

(In the equation, n is the number of ribs, which is 6 in the case of the example of the present application.)

Sound Emission Resistance During Water Injection

Figure 5:
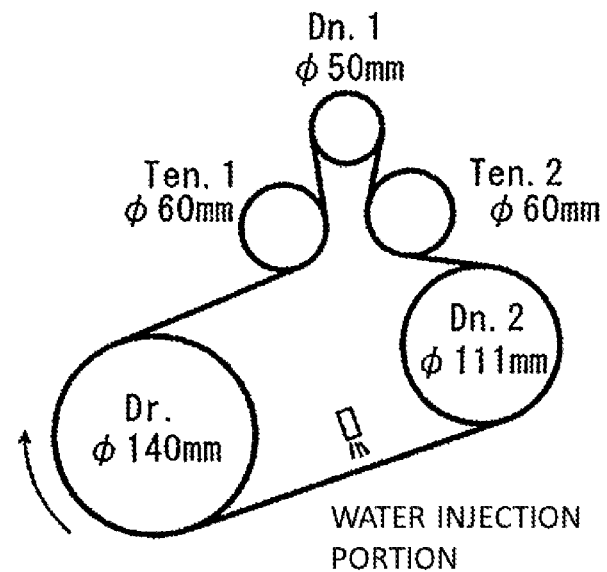
FIG. 5 is a schematic diagram illustrating a layout of a testing machine used in evaluation of sound emission resistance during water injection in Examples.

The belt was run on the testing machine having a layout shown in FIG. 5, and the sound emission resistance during water injection was evaluated. The testing machine included a driving pulley (Dr.) having a diameter of 140 mm, a tension pulley 1 (Ten. 1) having a diameter of 60 mm, a driven pulley 1 (Dn. 1) having a diameter of 50 mm, a tension pulley 2 (Ten. 2) having a diameter of 60 mm, and a driven pulley 2 (Dn. 2) having a diameter of 111 mm. The rotation speed of the driving pulley was varied at 800±160 rpm. The load of the driven pulley 1 was 16 N·m, and the driven pulley 2 was unloaded. The belt tension was set to 200 N/6 ribs. Water was intermittently injected from the compression rubber layer side of the belt at a position at a center between the driving pulley and the driven pulley 2. Water injection was performed once every 60 seconds (for 5 seconds). The amount of water injection was 100 cc/s (500 cc/5 s). The test temperature (atmospheric temperature) was set to 25° C., and the test time was set to 60 minutes. The presence or absence of abnormal noise during the test was confirmed by hearing.

Durability Running Test

Figure 6:
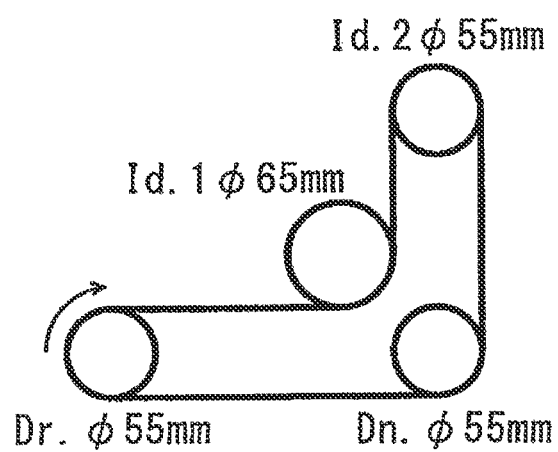
FIG. 6 is a schematic diagram illustrating a layout of a testing machine used in a durability running test in Examples.

The durability running test was performed by using a 4-axis running testing machine having a layout, as shown in the layout in FIG. 6, in which a driving pulley (Dr.) having a diameter of 55 mm, an idler pulley 1 (Id. 1) having a diameter of 65 mm, an idler pulley 2 (Id. 2) having a diameter of 55 mm, and a driven pulley (Dn.) having a diameter of 55 mm were disposed in order. A 6PK980 V-ribbed belt was hung on each pulley of the 4-axis running testing machine, the ambient temperature was set to 60° C., the rotation speed of the driving pulley was set to 2000 rpm, the idler pulley and driven pulley were unloaded, and the belt tension was set to 80 N/rib. Under the above conditions, the belt was run for up to 500 hours. The wear rate was calculated by measuring the mass of the V-ribbed belt before the durability running test and the mass of the V-ribbed belt after the durability running test according to the following equation. It can be said that the smaller the wear rate, the better the wear resistance.

$$\text{Wear rate } (\%) = [(\text{mass of V-ribbed belt before durability running test} - \text{mass of V-ribbed belt after durability running test})/\text{mass of V-ribbed belt before durability running test}] \times 100$$

Bleeding-Out of Rubber

The rib surface (knitted fabric covering the surface of the rib) of the produced V-ribbed belt was visually observed. A case where there was no bleeding-out of the rubber composition was determined as "A", and a case where even a little bleeding-out of the rubber composition was confirmed was determined as "C".

Rib Shape

The rib shape of the produced V-ribbed belt was measured with a contact type shape measuring instrument ("CBH-1" manufactured by Mitutoyo Corporation). A case where the rib height was 1.9 mm or more was determined as "A", a case where the rib height was 1.8 mm or more and less than 1.9 mm was determined as "B", and a case where the rib height was less than 1.8 mm was determined as "C".

The results are shown in Table 4.

TABLE 4

[Evaluation result of belt]

| | Example | | | | | | | | | |
|---|---|---|---|---|---|---|---|---|---|---|
| | 1 | 2 | 3 | 4 | 5 | 6 | 7 | 8 | 9 | 10 |
| Outer rubber layer formulation | R-3 | R-3 | R-3 | R-2 | R-3 | R-3 | R-3 | R-3 | R-3 | R-3 |
| Outer rubber composition Vm | 100 | 100 | 100 | 80 | 100 | 100 | 100 | 100 | 100 | 100 |
| Outer rubber layer thickness (mm) | 1.7 | 1.7 | — | — | 1.7 | 1.7 | 1.7 | 1.7 | 1.7 | 1.7 |
| Inner rubber layer formulation | R-1 | R-2 | R-3 | R-2 | R-5 | R-7 | R-8 | R-9 | R-5 | R-2 |
| Inner rubber composition Vm | 60 | 80 | 100 | 80 | 80 | 80 | 80 | 75 | 80 | 80 |
| Inner rubber layer thickness (mm) | 0.3 | 0.3 | — | — | 0.3 | 0.3 | 0.3 | 0.3 | 0.3 | 0.3 |
| Type of knitted fabric | A | A | A | A | A | A | A | A | B | C |
| Bleeding-out of rubber | A | A | A | A | A | A | A | A | A | A |
| Rib shape | A | A | A | A | A | A | A | A | A | A |
| Sound emission resistance during water injection (min.) | 60≤ | 60≤ | 60≤ | 60≤ | 30 | 60≤ | 60≤ | 60≤ | 50 | 60≤ |
| Durability running test (life time (hrs)) | 500≤ | 500≤ | 500≤ | 450 | 500≤ | 500≤ | 500≤ | 500≤ | 500≤ | 500≤ |
| Durability running test (wear rate (%)) | 1.8 | 1.6 | 1.8 | 1.6 | 1.7 | 1.7 | 2.7 | 2.1 | 1.7 | 2.7 |

| | Comparative Example | | | | |
|---|---|---|---|---|---|
| | 1 | 2 | 3 | 4 | 5 |
| Outer rubber layer formulation | R-3 | R-3 | R-4 | R-1 | R-6 |
| Outer rubber composition Vm | 100 | 100 | 40 | 60 | 150 |
| Outer rubber layer thickness (mm) | 1.7 | 1.7 | 1.7 | 1.7 | 1.7 |
| Inner rubber layer formulation | R-4 | R-6 | R-2 | R-2 | R-2 |
| Inner rubber composition Vm | 40 | 150 | 80 | 80 | 80 |
| Inner rubber layer thickness (mm) | 0.3 | 0.3 | 0.3 | 0.3 | 0.3 |
| Type of knitted fabric | A | A | A | A | A |
| Bleeding-out of rubber | C | A | A | A | A |
| Rib shape | A | A | A | A | C |
| Sound emission resistance during water injection (min.) | 1 | 60≤ | 60≤ | 60≤ | 60≤ |
| Durability running test (life time (hrs)) | 300 | 120 | 80 | 250 | 200 |
| Durability running test (wear rate (%)) | 3.8 | 2.9 | 1.9 | 3.3 | 2.5 |

In Examples 3 to 4, the compression rubber layer was formed of one unvulcanized rubber sheet (thickness: 2.0 mm) prepared by calender processing. In Examples 1 to 2, 5 to 10 and Comparative Examples 1 to 5, the compression rubber layer was formed of an unvulcanized rubber sheet for inner rubber layer and an unvulcanized rubber sheet for outer rubber layer each having a predetermined thickness prepared by calender processing.

In Examples 3 to 4, the inner rubber layer and the outer rubber layer of the compression rubber layer were formed of the same rubber composition, and in Examples 1 to 2, 5 to 10 and Comparative Examples 1 to 5, the inner rubber layer and the outer rubber layer of the compression rubber layer were formed of different rubber compositions.

In Examples 1 to 10, since the Vm of the rubber composition forming the inner rubber layer of the compression rubber layer was within a certain range, the rib shape was good and the rubber composition did not bleed out to the frictional power transmission surface. In terms of sound emission resistance during water injection, no abnormal noise was generated for 30 minutes or longer, which was a good result, and the durability running test also showed a life time of 450 hours or longer.

In contrast, in Comparative Example 1 in which the Vm of the rubber composition forming the inner rubber layer was the lowest, bleeding-out of the rubber composition to the frictional power transmission surface occurred. Therefore, the sound emission resistance during water injection was low, cracks were generated in the rib portion in the durability running test, and the durability was also low. In Comparative Example 2 in which the Vm of the rubber composition forming the inner rubber layer was the highest, the adhesiveness to the knitted fabric was lowered, and the life time was short in the durability running test.

In Comparative Example 3 in which the Vm of the rubber composition forming the outer rubber layer was the lowest, the physical properties were deteriorated, and the life time was short in the durability running test. Also in Comparative Example 4 in which the Vm of the rubber composition forming the outer rubber layer was low, the physical properties were deteriorated, and the life time was short in the durability running test. In Comparative Example 5 in which the Vm of the rubber composition forming the outer rubber layer was the highest, the rib shape was poor. Therefore, in the durability running test, the slip became large and the life time was short.

Among Examples, Example 2 had the best balance of various properties. In contrast, in Example 1 in which the Vm of the rubber composition forming the inner rubber layer was lower than that in Example 2, the holding force for the knitted fabric was lowered and the wear resistance was slightly lowered. In Example 3 in which the Vm of the rubber composition forming the inner rubber layer was higher than that in Example 2, the penetration to the knitted fabric was lowered and the wear resistance was slightly lowered. In Example 4 in which the Vm of the rubber composition forming the outer rubber layer was slightly lower than that in Example 2, the physical properties were deteriorated and the durable life time was shortened.

In Example 5 in which the rubber composition forming the inner rubber layer did not contain a hydrophilic plasticizer, the sound emission resistance during water injection was lowered. In Example 6 in which the types of the plasticizer, the unsaturated carboxylic acid metal salt, and the polyolefin particles of the rubber composition forming the inner rubber layer were changed, the result was the same as in Example 2. In Example 7 in which the rubber composition forming the inner rubber layer did not contain an unsaturated carboxylic acid metal salt and polyolefin particles, the wear resistance was lowered. In Example 8 in which the proportion of the polyolefin particles in the rubber composition forming the inner rubber layer was small, the wear resistance was also lowered. In Example 9 in which the rubber composition forming the inner rubber layer did not contain a hydrophilic plasticizer and the hydrophilic plasticizer was attached to the knitted fabric, the sound emission resistance during water injection was lowered. In Example 10 in which the treatment liquid for the knitted fabric was changed from the isocyanate treatment liquid to the RFL treatment liquid, the wear resistance was lowered.

Although the present invention has been described in detail with reference to a specific embodiment, it is obvious to those skilled in the art that various changes and modifications may be made without departing from the gist and the scope of the invention.

This application is based on Japanese Patent Application No. 2019-12559 filed on Jan. 28, 2019, Japanese Patent Application No. 2019-194656 filed on Oct. 25, 2019, and Japanese Patent Application No. 2019-238462 filed on Dec. 27, 2019, contents of which are incorporated by reference herein.

INDUSTRIAL APPLICABILITY

The V-ribbed belt of the present invention can be used in combination with a pulley as a power transmission belt in various fields such as automobiles, motorcycles, snow vehicles, industrial machines, and agricultural machines (including large agricultural machines). The V-ribbed belt of the present invention is particularly useful as a V-ribbed belt for driving an auxiliary machine of an automobile because of being capable of reducing the torque loss and having high durability even in power transmission under high load.

REFERENCE SIGNS LIST

1 V-ribbed belt
2 tension rubber layer
3 compression rubber layer
3a inner rubber layer
3b outer rubber layer
4 cord
5 rib portion
6 knitted fabric

The invention claimed is:

1. A V-ribbed belt comprising a compression rubber layer having a frictional power transmission surface that is covered with a fabric, the compression rubber layer comprising an inner rubber layer in contact with the fabric and an outer rubber layer on an outer side of the inner rubber layer,
wherein the inner rubber layer is formed of a rubber composition having a Mooney Scorch minimum viscosity of 50 to 110 when measured at 125° C.,
wherein the outer rubber layer is formed of a rubber composition having a Mooney Scorch minimum viscosity of 70 to 130 when measured at 125° C.,
wherein the rubber composition forming the inner rubber layer has a lower Mooney Scorch minimum viscosity than the rubber composition forming the outer rubber layer, and
wherein the V-ribbed belt comprises rib portions extending in a longitudinal direction.

2. The V-ribbed belt according to claim 1,
wherein a thickness ratio of the inner rubber layer to the entire compression rubber layer is 1% to 50%.

3. The V-ribbed belt according to claim 1,
wherein the rubber composition forming the inner rubber layer contains a hydrophilic plasticizer.

4. The V-ribbed belt according to claim 1,
wherein the rubber composition forming the inner rubber layer contains polyolefin particles.

5. The V-ribbed belt according to claim 1,
wherein the fabric is impregnated with or adhered to an isocyanate compound.

6. The V-ribbed belt according to claim 1, further comprising a cord extending in a longitudinal direction of a belt body,
wherein a tensile elastic modulus of fibers constituting the cord is 50 GPa or more.

7. The V-ribbed belt according to claim 1, comprising:
a belt body comprising at least a tension rubber layer forming a belt back surface and the compression rubber layer laminated on an inner peripheral surface of the tension rubber layer and having rib portions extending in a longitudinal direction;
a cord embedded in the longitudinal direction of the belt body; and
the fabric which is a knitted fabric laminated on the rib portions as the frictional power transmission surface and containing at least cellulose fibers,
wherein the inner rubber layer is formed of the rubber composition having a Mooney Scorch minimum viscosity of 60 to 100 when measured at 125° C.,
wherein the outer rubber layer is formed of the rubber composition having a Mooney Scorch minimum viscosity of 80 to 120 when measured at 125° C.,
wherein the cord is formed of aramid fibers and/or carbon fibers, and
wherein the knitted fabric is impregnated with or adhered to at least a block-type polyisocyanate compound.

8. A method for producing a V-ribbed belt, the method comprising:
disposing, on a cylindrical inner mold disposed in a hollow cylindrical outer mold, an unvulcanized laminate comprising an unvulcanized rubber sheet for compression rubber layer and a fabric laminated on the unvulcanized rubber sheet so that the fabric is directed toward the outer mold;
pressurizing the unvulcanized rubber sheet at least toward the outer mold to vulcanize the unvulcanized rubber sheet; and
demolding a molded body of the vulcanized rubber sheet and the fabric to produce a V-ribbed belt having a predetermined form,
wherein the unvulcanized rubber sheet for compression rubber layer is formed of an unvulcanized rubber sheet for inner rubber layer in contact with the fabric and an unvulcanized rubber sheet for outer rubber layer on an outer side of the unvulcanized rubber sheet for inner rubber layer, wherein the unvulcanized rubber sheet for inner rubber layer is formed of a rubber composition having a Mooney Scorch minimum viscosity of 50 to 110 when measured at 125° C., wherein the unvulcanized rubber sheet for outer rubber layer is formed of a rubber composition having a Mooney Scorch minimum viscosity of 70 to 130 when measured at 125° C., wherein the rubber composition forming the inner rubber layer has a lower Mooney Scorch minimum viscosity than the rubber composition forming the outer rubber layer, and wherein the V-ribbed belt comprises rib portions extending in a longitudinal direction.

9. The method according to claim 8, wherein the unvulcanized rubber sheet is pressurized and vulcanized at a pressure of 1.2 MPa or more.

10. The method according to claim 8, wherein the unvulcanized rubber sheet for compression rubber layer is prepared by rolling an unvulcanized rubber sheet with a calender roll to form the unvulcanized rubber sheet for inner rubber layer which forms a frictional power transmission surface, and laminating the unvulcanized rubber sheet for inner rubber with the unvulcanized rubber sheet for outer rubber layer on the calender roll.

11. The method according to claim 8, comprising:

disposing the unvulcanized laminate which is a hollow cylindrical or sleeve-shaped unvulcanized laminate comprising:

an unvulcanized rubber laminated sheet for forming a belt body comprising at least the unvulcanized rubber sheet for compression rubber layer and an unvulcanized rubber sheet for tension rubber layer laminated or disposed on one surface of the unvulcanized rubber sheet for compression rubber layer;

a cord embedded in a longitudinal direction of the unvulcanized rubber laminated sheet; and the fabric which is a knitted fabric laminated or disposed on the other surface of the unvulcanized rubber sheet for compression rubber layer, so that the knitted fabric is directed toward a rib mold of the outer mold; and pressurizing and vulcanizing the unvulcanized rubber laminated sheet with an expansion pressure of a flexible jacket that is mounted on the inner mold and is expandable and contractile.

12. The V-ribbed belt according to claim 1, wherein the inner rubber layer is formed separately from and disposed in contact with the fabric.

13. The V-ribbed belt according to claim 1, wherein the Mooney Scorch minimum viscosity of the rubber composition forming the inner layer is 10 to 30 lower than the Mooney Scorch minimum viscosity of the rubber composition forming the outer layer.

14. The method according to claim 8, wherein the inner rubber layer is formed separately from and disposed in contact with the fabric.

15. The method according to claim 8, wherein the Mooney Scorch minimum viscosity of the rubber composition forming the inner layer is adjusted to be 10 to 30 lower than the Mooney Scorch minimum viscosity of the rubber composition forming the outer layer.

* * * * *